(12) United States Patent
Konomi et al.

(10) Patent No.: US 9,079,602 B2
(45) Date of Patent: Jul. 14, 2015

(54) STEERING SYSTEM AND STEERING CONTROL APPARATUS

(75) Inventors: Kenji Konomi, Numazu (JP); Yuji Ebihara, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 13/699,688

(22) PCT Filed: May 20, 2011

(86) PCT No.: PCT/IB2011/001089
§ 371 (c)(1),
(2), (4) Date: Nov. 23, 2012

(87) PCT Pub. No.: WO2011/148240
PCT Pub. Date: Dec. 1, 2011

(65) Prior Publication Data
US 2013/0073146 A1 Mar. 21, 2013

(30) Foreign Application Priority Data

May 24, 2010 (JP) ................................. 2010-118754

(51) Int. Cl.
*B62D 6/00* (2006.01)
*B62D 6/02* (2006.01)
*B62D 6/04* (2006.01)
*B62D 6/08* (2006.01)
*B62D 5/04* (2006.01)

(52) U.S. Cl.
CPC .............. *B62D 6/007* (2013.01); *B62D 5/0472* (2013.01); *B62D 6/008* (2013.01); *B62D 6/02* (2013.01); *B62D 6/04* (2013.01); *B62D 6/08* (2013.01)

(58) Field of Classification Search
CPC ...... B62D 5/046; B62D 5/0472; B62D 6/007; B62D 6/008; B62D 6/02; B62D 6/04; B62D 6/08
USPC ...................................................... 701/41, 42
See application file for complete search history.

(56) References Cited

U.S. PATENT DOCUMENTS

2004/0200661 A1  10/2004 Sugitani et al.
2008/0243341 A1* 10/2008 Hayama et al. ................ 701/42
2009/0254253 A1* 10/2009 Ghoneim et al. ............... 701/42

FOREIGN PATENT DOCUMENTS

EP    1 142 746    10/2001
EP    1 433 691    6/2004
(Continued)

OTHER PUBLICATIONS

Japanese Office Action Issued May 7, 2012 in JP Patent Application No. 2010-118754 Filed May 24, 2010 (with partial English translation).
(Continued)

*Primary Examiner* — John Q Nguyen
*Assistant Examiner* — Anshul Sood
(74) *Attorney, Agent, or Firm* — Oblon, McClelland, Maier & Neustadt, L.L.P.

(57) ABSTRACT

A steering system including a steering member provided in a vehicle and configured to be rotated, an adjustment apparatus configured to adjust a rotary direction vibration of the steering member, and a steering control apparatus configured to control the adjustment apparatus, in accordance with an operating condition of the vehicle, so as to adjust the vibration.

12 Claims, 11 Drawing Sheets

(56) References Cited

FOREIGN PATENT DOCUMENTS

| | | |
|---|---|---|
| JP | 2005 225403 | 8/2005 |
| JP | 2006 137341 | 6/2006 |
| JP | 2006 240479 | 9/2006 |
| JP | 2006 335228 | 12/2006 |
| JP | 2007 84006 | 4/2007 |
| JP | 2007 269175 | 10/2007 |
| JP | 2008 143234 | 6/2008 |
| JP | 2010-36846 | 2/2010 |

OTHER PUBLICATIONS

International Search Report Issued Aug. 18, 2011 in PCT/IB11/001089 Filed May 20, 2011.

* cited by examiner

301(308)

| SET MODE OF ECS SYSTEM | DURING FORWARD ADVANCEMENT | DURING TURN |
|---|---|---|
| COMFORT | F21 | F21 |
| NORMAL | F21 | F22 |
| SPORT | F22 | F23 |

401(408)

| SHIFT MODE | DURING FORWARD ADVANCEMENT | DURING TURN |
|---|---|---|
| AT MODE | F31 | F31 |
| MT MODE | F31 | F32 |

401(408)

501(508)

| DECELERATION | DURING FORWARD ADVANCEMENT | DURING TURN |
|---|---|---|
| LOW DECELERATION | F41 | F42 |
| HIGH DECELERATION | F42 | F43 |
| EVEN HIGHER DECELERATION | F41 | F42 |

601(608)

| MAGNITUDE OF LATERAL ACCELERATION | |
|---|---|
| LOW ACCELERATION | F51 |
| MEDIUM ACCELERATION | F52 |
| HIGH ACCELERATION | F53 |

# STEERING SYSTEM AND STEERING CONTROL APPARATUS

BACKGROUND OF THE INVENTION

1. Field of the Invention

The invention relates to a steering system and a steering control apparatus.

2. Description of the Related Art

As a conventional steering system or steering control apparatus, Japanese Patent Application Publication No. 2006-335228 (JP-A-2006-335228), for example, describes an electric power steering (EPS) control system/apparatus that suppresses steering wheel vibration by causing a motor to generate a total assist torque corresponding to a difference between a main assist torque, which corresponds to a steering torque, and a vibration suppressing control torque for suppressing motor vibration, vibration in a steering system accompanying the motor vibration, and vibration caused by disturbances. This EPS control system/apparatus switches a filter characteristic for suppressing the steering wheel vibration in accordance with a vehicle speed, for example.

Incidentally, it is desirable for an EPS control system/apparatus such as that described in JP-A-2006-335228 to realize a driving feeling that corresponds to vehicle conditions and so on, for example.

SUMMARY OF THE INVENTION

The invention provides a steering system and a steering control apparatus with which a driving feeling can be varied in accordance with operating conditions of a vehicle.

A first aspect of the invention is a steering system including: a steering member provided in a vehicle and configured to be rotated; an adjustment apparatus configured to adjust a rotary direction vibration of the steering member; and a steering control apparatus configured to control the adjustment apparatus, in accordance with an operating condition of the vehicle, so as to adjust the vibration.

In the steering system described above, the adjustment apparatus may be configured to adjust a degree by which the vibration is transmitted to the steering member.

Further, in the steering system described above, the steering control apparatus may control the adjustment apparatus to increase the vibration when a speed of the vehicle is relatively high, relative to the vibration when the speed is relatively low.

Further, in the steering system described above, the steering control apparatus may control the adjustment apparatus to increase the vibration when a torque acting on the steering member is relatively large, relative to the vibration when the torque is relatively small.

Further, in the steering system described above, the steering control apparatus may control the adjustment apparatus to increase the vibration when a steering angle of the steering member is relatively large, relative to the vibration when the steering angle is relatively small.

Further, in the steering system described above, the steering control apparatus may control the adjustment apparatus to increase the vibration when an absolute value of an acceleration acting on the vehicle is relatively large, relative to the vibration when the absolute value of the acceleration is relatively small.

Further, in the steering system described above, the steering control apparatus may control the adjustment apparatus to increase the vibration when a steering angle velocity of the steering member is relatively large, relative to the vibration when the steering angle velocity is relatively small.

Further, in the steering system described above, the steering control apparatus may control the adjustment apparatus to vary a magnitude of the vibration in accordance with a driving tendency in driving the vehicle.

Further, in the steering system described above, the steering control apparatus may determine the driving tendency on the basis of an operating mode selected in another apparatus having a plurality of operating modes.

Further, in the steering system described above, the operating condition of the vehicle may be at least one of a speed of the vehicle, a torque acting on the steering member, a steering angle of the steering member, a steering angle velocity of the steering member, an acceleration acting on the vehicle, and a driving tendency of a driver relative to the vehicle.

Further, in the steering system described above, the adjustment apparatus may adjust the vibration by outputting an assist steering force for supplementing a steering force input into the steering member by the driver, and the steering control apparatus may adjust the assist steering force in accordance with the operating condition of the vehicle.

Further, in the steering system described above, the steering control apparatus may modify a filter characteristic of a filter used to calculate the assist steering force in accordance with the operating condition of the vehicle.

Further, in the steering system described above, the steering control apparatus may be configured to control the adjustment apparatus in accordance with a selection operation performed by a user.

A second aspect of the invention is a steering system including: a steering member provided in a vehicle and configured to be rotated; an adjustment apparatus configured to adjust a rotary direction vibration of the steering member; and a control apparatus configured to adjust the vibration by controlling the adjustment apparatus in accordance with a selection operation performed by a user via a selection apparatus.

A third aspect of the invention is a steering control apparatus including a controller configured to control an adjustment apparatus, in accordance with an operating condition of a vehicle, so as to adjust a rotary direction vibration of a steering member.

According to the first to third aspects described above, the rotary direction vibration of the steering member can be adjusted by controlling the adjustment apparatus, and therefore a driving feeling can be varied in accordance with the operating condition of the vehicle.

BRIEF DESCRIPTION OF THE DRAWINGS

The foregoing and further objects, features, and advantages of the invention will become apparent from the following description of example embodiments with reference to the accompanying drawings, wherein like numerals are used to represent like elements and wherein.

DETAILED DESCRIPTION OF EMBODIMENTS

Embodiments of a steering system and a steering control apparatus according to the invention will be described in detail below on the basis of the drawings. Note that the invention is not limited by the embodiments. Further, constitutional elements of the following embodiments include elements that could be interchanged easily by a person skilled in the art and substantially identical elements.

First Embodiment

Figure 1:
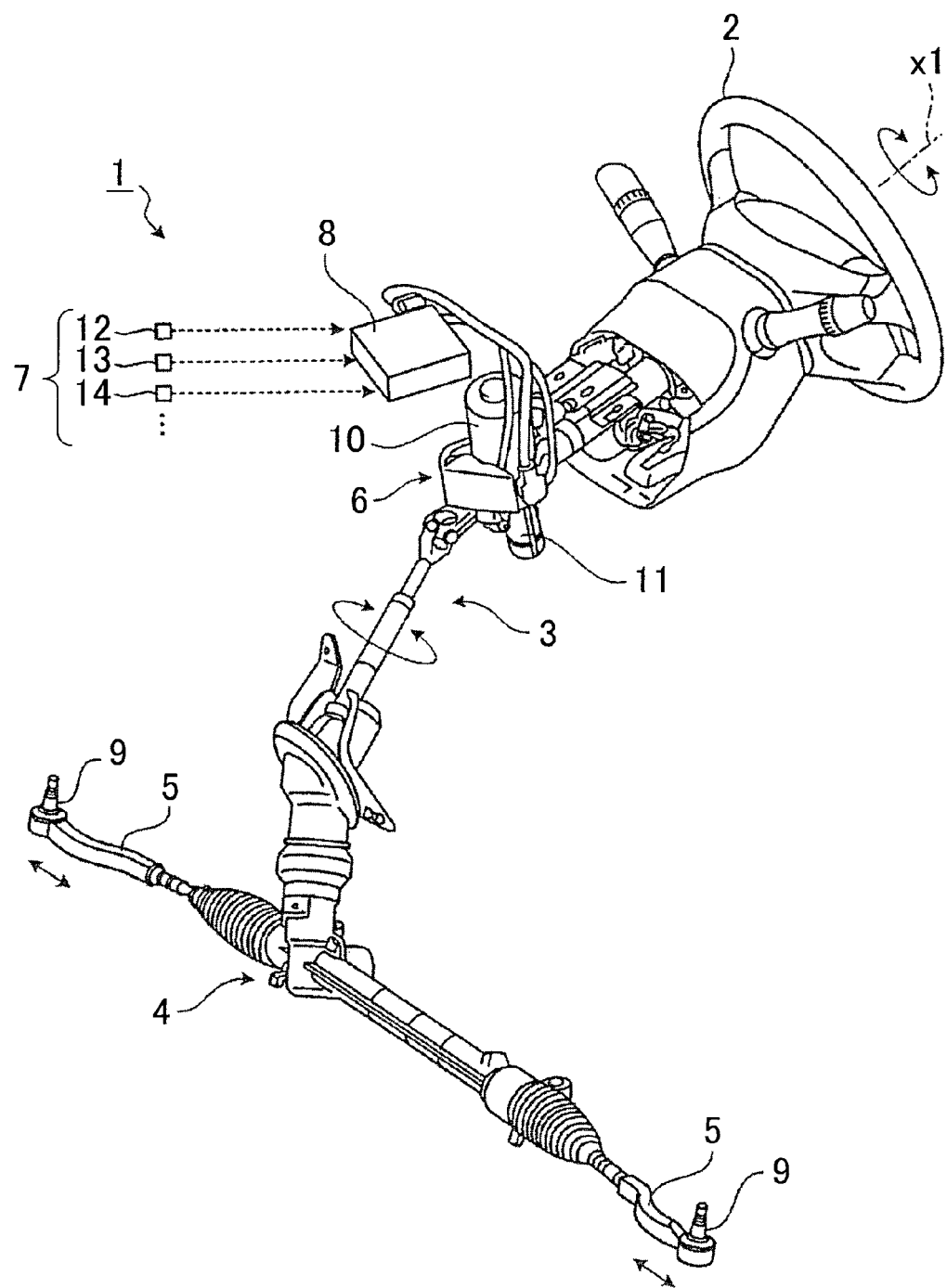
FIG. 1 is a schematic perspective view showing an outline of the constitution of a steering system according to a first embodiment.
Figure 2:
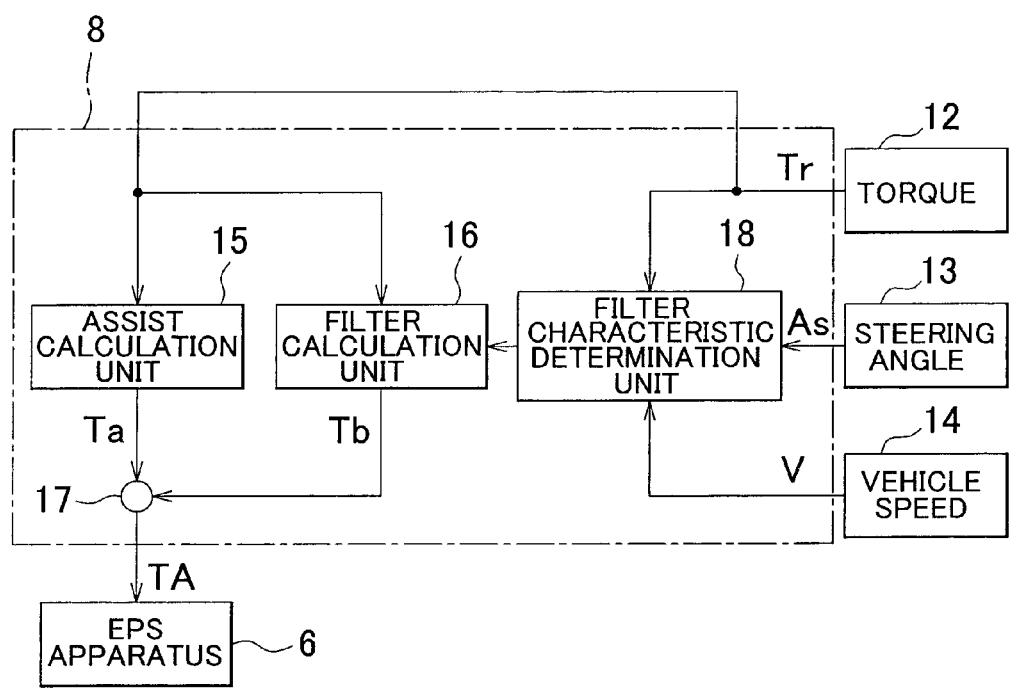
FIG. 2 is a block diagram showing an outline of the constitution of an EPS control apparatus according to the first embodiment.
Figure 3:
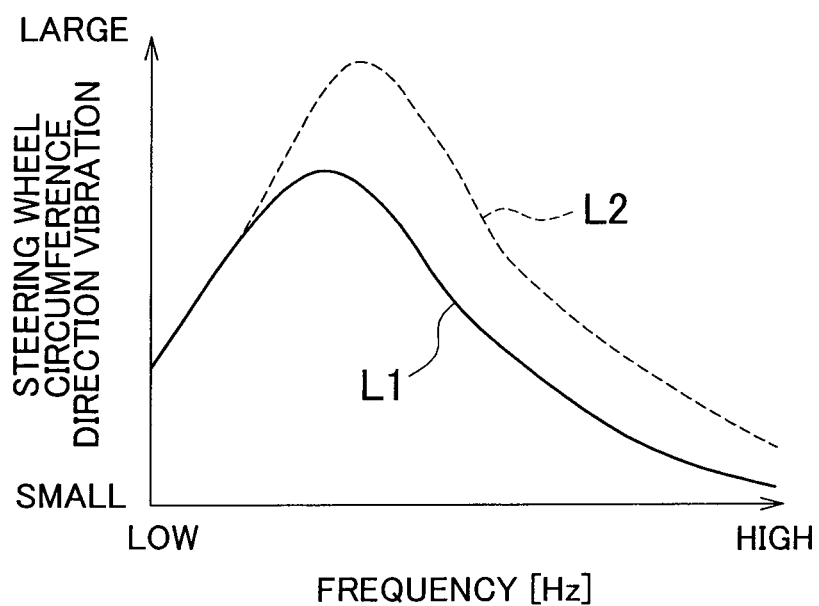
FIG. 3 is a line diagram showing an example of steering wheel circumference direction vibration in the steering system according to the first embodiment.
Figure 4:
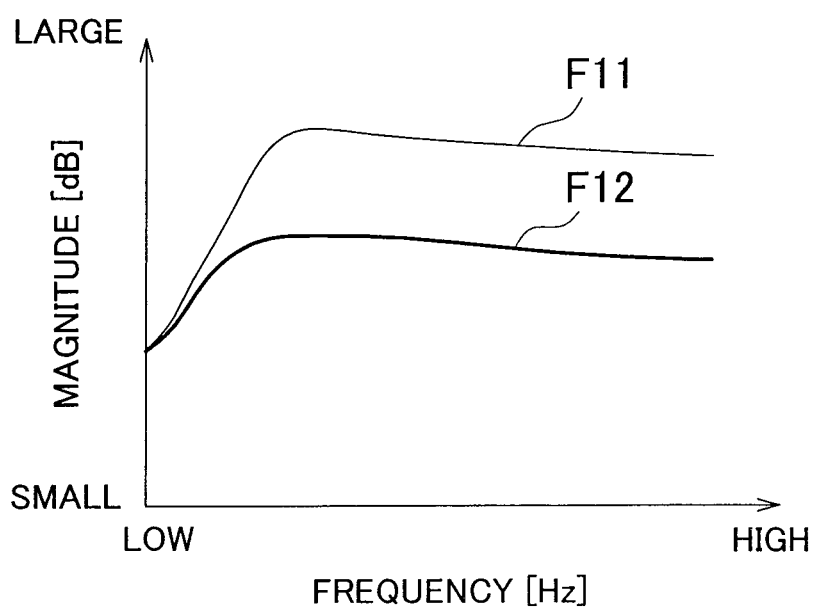
FIG. 4 is a line diagram showing an example of filter characteristics of the steering system according to the first embodiment.
Figure 5:
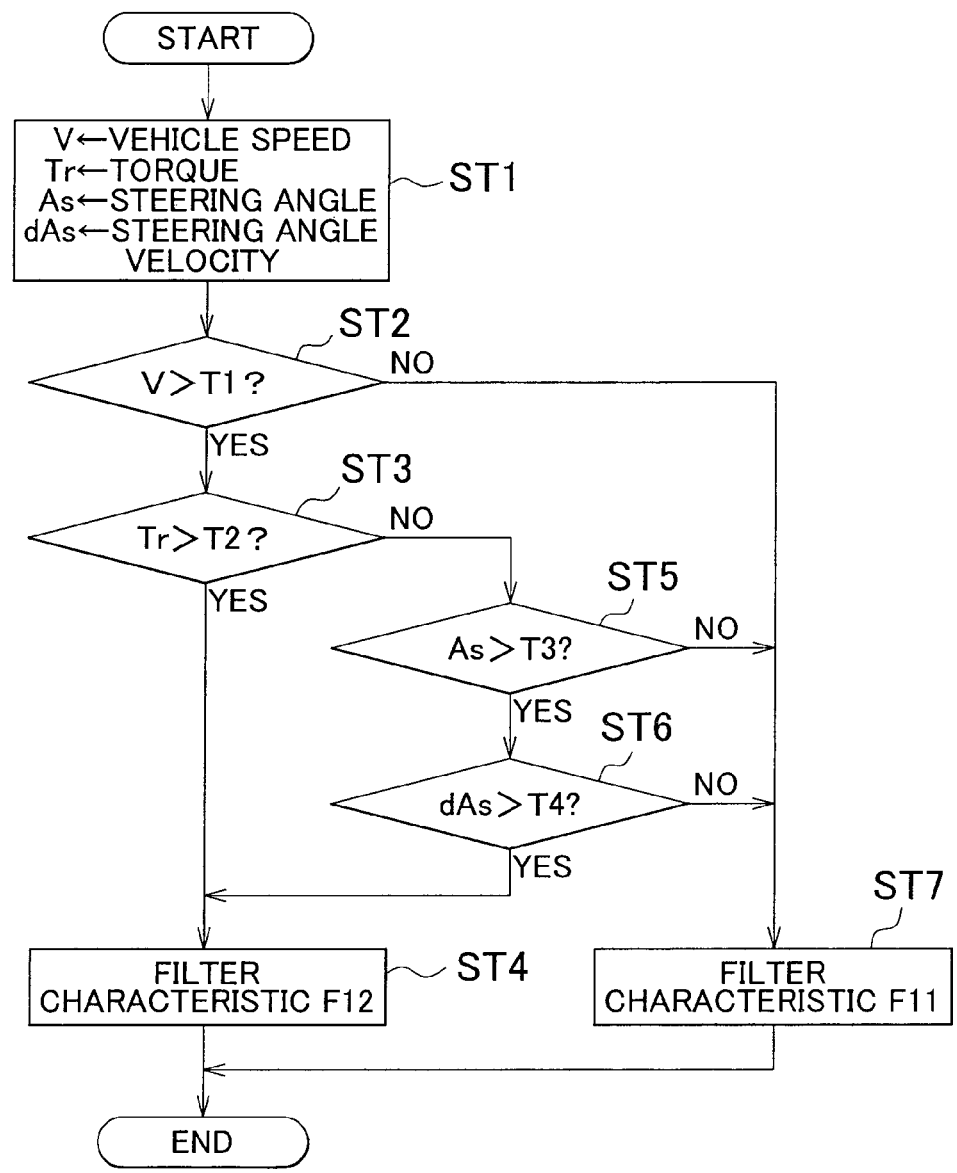
FIG. 5 is a flowchart illustrating an example of control executed by the EPS control apparatus according to the first embodiment.

FIG. 1 is a schematic perspective view showing an outline of the constitution of a steering system according to a first embodiment. FIG. 2 is a block diagram showing an outline of the constitution of an EPS control apparatus according to the first embodiment. FIG. 3 is a line diagram showing an example of steering wheel circumference direction vibration in the steering system according to the first embodiment. FIG. 4 is a line diagram showing an example of filter characteristics of the steering system according to the first embodiment. FIG. 5 is a flowchart illustrating an example of control executed by the EPS control apparatus according to the first embodiment.

A steering system 1 according to this embodiment, shown in FIG. 1, is installed in a vehicle to steer a steered wheel of the vehicle. The steering system 1 according to this embodiment is a so-called electric power steering (EPS) system that supplements a steering force of the vehicle with power from an electric motor or the like. The steering system 1 assists a steering operation performed by a driver by driving the electric motor or the like to obtain an assist steering force corresponding to the steering force exerted by the driver on a steering wheel 2 serving as a steering member.

More specifically, as shown in FIG. 1, the steering system 1 includes the steering wheel 2, a steering shaft (abbreviated to "shaft" hereafter unless otherwise noted) 3, a rack and pinion gear mechanism (abbreviated to "gear mechanism" hereafter unless otherwise noted) 4, a left-right pair of tie rods 5, an EPS apparatus 6 serving as an adjustment apparatus, a condition detection apparatus 7, and an EPS control apparatus 8 serving as a steering control apparatus.

The steering wheel 2 is provided in front of a driving seat of the vehicle to be rotatable in a circumferential direction about a rotary axis X1. The driver performs a steering operation by rotating the steering wheel 2 about the rotary axis X1. In other words, the driver steers (turns) the steered wheel of the vehicle installed with the steering system 1 by operating the steering wheel 2.

The shaft 3 serves as a rotary axis portion of the steering wheel 2. One end of the shaft 3 is coupled to the steering wheel 2, and the other end is coupled to the gear mechanism 4. In other words, the steering wheel 2 is connected to the gear mechanism 4 via the shaft 3. The shaft 3 is capable of rotating about a central axis in accordance with the operation performed by the driver to rotate the steering wheel 2. Here, the shaft 3 is divided into a plurality of members such as an upper shaft, an intermediate shaft, a lower shaft, and so on, for example.

The gear mechanism 4 mechanically couples the shaft 3 to the pair of tie rods 5. The gear mechanism 4 includes a so-called rack and pinion type gear mechanism, for example, and converts a rotary motion of the shaft 3 about the central axis into a linear motion of the pair of tie rods 5 in a left-right direction (typically corresponding to a vehicle width direction of the vehicle).

Respective base end portions of the pair of tie rods 5 are coupled to the gear mechanism 4, while tie rod ends 9 serving as tip end portions are coupled to respective steered wheels via knuckle arms (not shown). In other words, the steering wheel 2 is coupled to the respective steered wheels via the shaft 3, the gear mechanism 4, the respective tie rods 5, and so on.

The EPS apparatus 6 outputs an assist steering force (assist torque) for supplementing a steering force (steering torque) input into the steering wheel 2 by the driver. In other words, the EPS apparatus 6 assists a steering operation performed by the driver by driving the steered wheels of the vehicle using an electric motor or the like. The EPS apparatus 6 assists the steering operation performed by the driver by applying the assist torque to the shaft 3. Here, the assist torque is a torque for supplementing a steering torque that corresponds to the steering force input into the steering wheel 2 by the driver.

Here, the EPS apparatus 6 includes a motor 10 serving as the electric motor, and a reduction gear 11. The EPS apparatus 6 according to this embodiment is a column EPS apparatus in which the motor 10 is provided on a part of the shaft 3 such as the intermediate shaft, for example, or in other words a so-called column assist type assist mechanism.

The motor 10 is a column assist electric motor that generates a rotary force (motor torque) when supplied with power.

The motor 10 thus generates the assist steering force (assist torque). The motor 10 is connected to the shaft 3 via the reduction gear 11 and so on to be capable of transmitting power thereto, and applies the assist steering force to the shaft 3 via the reduction gear 11 and so on. The reduction gear 11 reduces the rotary force of the motor 10 and then transmits the reduced rotary force to the shaft 3.

The EPS apparatus 6 provides steering assistance by driving the motor 10 to rotate so that the rotary force generated by the motor 10 is transmitted to the shaft 3 via the reduction gear 11. At this time, the rotary force generated by the motor 10 is transmitted to the shaft 3 after being reduced by the reduction gear 11 such that the torque increases. The EPS apparatus 6 is electrically connected to the EPS control apparatus 8, to be described below, and driving of the motor 10 is controlled thereby.

The condition detection apparatus 7 detects conditions of the vehicle installed with the steering system 1, and is constituted by various sensors and the like. The condition detection apparatus 7 is electrically connected to the EPS control apparatus 8 to exchange detection signals, drive signals, and information such as control commands. For example, the condition detection apparatus 7 includes a torque sensor 12 for detecting the torque acting on the steering wheel 2, a steering angle sensor 13 for detecting a steering angle, i.e. a rotary angle of the steering wheel 2, a vehicle speed sensor 14 for detecting a vehicle speed of the vehicle installed with the steering system 1, and so on. The torque sensor 12 detects a torque acting on a torsion bar (not shown), which is a torsion member serving as a part of the EPS apparatus 6, for example. The torque detected by the torque sensor 12 typically reflects the steering torque acting on the shaft 3 in accordance with the steering force input into the steering wheel 2 by the driver, a disturbance torque input into the shaft 3 from the steered wheel side via the tie rod ends 9 when a road surface disturbance or the like is input into the steered wheels, and so on.

The EPS control apparatus 8 controls driving of the EPS apparatus 6. The EPS control apparatus 8 is an electronic circuit having as a main body a conventional microcomputer including a central processing unit (CPU), read-only memory (ROM), random access memory (RAM) and an interface. The various aforesaid sensors of the condition detection apparatus 7 and the EPS apparatus 6, for example, are electrically connected to the EPS control apparatus 8. The EPS control apparatus 8 controls driving of the EPS apparatus 6 by inputting electric signals corresponding to detection results from the various sensors and outputting a drive signal to the EPS apparatus 6 in accordance with the input detection results. Note that the EPS control apparatus 8 may be electrically connected to an electronic control unit (ECU) for controlling each part of the vehicle installed with the steering system 1, for example, so as to exchange detection signals, drive signals, information such as control commands, and so on with the ECU. Alternatively, the EPS control apparatus 8 may be formed integrally with the ECU.

The EPS control apparatus 8 controls the EPS apparatus 6 on the basis of the torque detected by the torque sensor 12 and so on such that the EPS apparatus 6 adjusts the assist torque applied to the shaft 3. The EPS control apparatus 8 adjusts the assist torque by adjusting an assist current serving as a current supplied to the motor 10 of the EPS apparatus 6 in order to adjust an output of the motor 10. Here, the assist current is a supplied current with an amount ensuring that a predetermined assist torque required by the EPS apparatus 6 can be generated.

The EPS control apparatus 8 basically controls the motor 10 on the basis of the torque detected by the torque sensor 12 so that the EPS apparatus 6 generates an assist torque corresponding to the steering torque (assist control). Further, the EPS control apparatus 8 executes control (vibration suppression control) to suppress rotary direction vibration acting on the steering wheel 2, or in other words vibration in the circumferential direction about the rotary axis X1, by adjusting the assist torque generated by the EPS apparatus 6 on the basis of the torque detected by the torque sensor 12.

For example, when a disturbance such as input from the road surface or brake vibration is input into the tie rods 5 of the steering system 1, the disturbance may be transmitted to the driver via the gear mechanism 4 and the shaft 3 as rotary direction vibration acting on the steering wheel 2. Hence, by adjusting the output of the motor 10, or in other words adjusting the assist torque generated by the EPS apparatus 6, in accordance with the operating conditions, the EPS control apparatus 8 suppresses vibration in the rotary direction of the steering wheel 2 corresponding to the disturbance input via the tie rods 5. In other words, the EPS apparatus 6 also functions as a vibration suppression apparatus that generates an assist torque for suppressing vibration occurring when a disturbance is input from the steered wheel side, while the EPS control apparatus 8 suppresses disturbance vibration by correcting an assist characteristic of the EPS apparatus 6.

As shown in FIG. 2, for example, the EPS control apparatus 8 is constituted by an assist calculation unit 15, a filter calculation unit 16, and a final assist amount calculation unit 17.

The assist calculation unit 15 is an calculation unit for calculating an assist amount, which performs a predetermined assist calculation to calculate an assist torque corresponding to the steering torque as a basic assist amount Ta. For example, a torque signal corresponding to a torque Tr detected by the torque sensor 12 is input into the assist calculation unit 15. The assist calculation unit 15 performs various types of filter processing on the torque signal to remove vibration in a predetermined frequency component, implements phase compensation on the processed signal, and calculates the basic assist amount Ta in accordance with the phase-compensated torque signal. The assist calculation unit 15 then outputs a signal corresponding to the basic assist amount Ta to the final assist amount calculation unit 17.

The filter calculation unit 16 is an calculation unit for controlling vibration, which performs a predetermined filter calculation to calculate an assist torque that cancels out the disturbance torque as a vibration suppressing assist torque Tb. For example, a torque signal corresponding to the torque Tr detected by the torque sensor 12 is input into the filter calculation unit 16. The filter calculation unit 16 calculates the vibration suppressing assist torque Tb for suppressing rotary direction vibration acting on the steering wheel 2 by performing various types of filter processing on the torque signal to remove vibration in a predetermined frequency component. The filter calculation unit 16 then outputs a signal corresponding to the vibration suppressing assist amount Tb to the final assist amount calculation unit 17.

The final assist amount calculation unit 17 calculates a final assist torque as a final assist amount TA on the basis of the basic assist amount Ta and the vibration suppressing assist amount Tb. For example, the final assist amount calculation unit 17 calculates the final assist amount TA by adding together the basic assist amount Ta corresponding to the steering torque and the vibration suppressing assist amount Tb for suppressing vibration caused by a road surface disturbance or the like. The final assist amount calculation unit 17 then outputs a signal corresponding to the final assist amount TA to the EPS apparatus 6, whereupon an assist current corresponding to the final assist amount TA is supplied to the motor 10.

As a result, the output of the motor 10 in the EPS apparatus 6 is adjusted such that the assist torque is adjusted to a predetermined magnitude.

In the steering system 1 constituted as described above, the steering torque input into the steering wheel 2 by the driver and the assist torque generated by the EPS apparatus 6 in accordance with the steering torque, the disturbance torque, and so on through the control of the EPS control apparatus 8 are exerted on the shaft 3. When the steering force and the assist steering force are exerted on the tie rods 5 from the shaft 3 via the gear mechanism 4 in the steering system 1, the tie rods 5 are displaced in the left-right direction by an axial force of a magnitude that corresponds to the steering torque and the assist torque, and as a result, the steered wheels are turned.

Hence, the steering system 1 is capable of turning the steered wheels using the steering force input into the steering wheel 2 by the driver and the assist steering force generated by the EPS apparatus 6. Accordingly, the steering system 1 can assist the steering operation performed by the driver such that a load placed on the driver during the steering operation can be lightened. At this time, the steering system 1 can suppress rotary direction vibration acting on the steering wheel 2 by having the EPS control apparatus 8 adjust the assist torque generated by the EPS apparatus 6. Therefore, by adjusting the output of the motor 10 such that the assist torque is adjusted, the steering system 1 can assist the steering operation performed by the driver and suppress rotary direction vibration acting on the steering wheel 2.

Incidentally, the steering system 1 according to this embodiment varies a driving feeling imparted to the driver in accordance with the operating conditions of the vehicle by executing control in which the EPS control apparatus 8 controls the EPS apparatus 6 to adjust the rotary direction vibration acting on the steering wheel 2 appropriately.

FIG. 3 is a line diagram showing an example of steering wheel circumference direction vibration serving as the rotary direction vibration acting on the steering wheel 2, wherein the abscissa shows a frequency and the ordinate shows the steering wheel circumference direction vibration. In FIG. 3, a solid line L1 represents steering wheel circumference direction vibration in an EPS apparatus such as the steering system 1 according to this embodiment, and a dotted line L2 represents steering wheel circumference direction vibration in a so-called hydraulic power steering system. As shown in the diagram, the steering wheel circumference direction vibration of the EPS apparatus, indicated by the solid line L1, tends to be smaller than that of the hydraulic power steering system indicated by the dotted line L2. In an EPS apparatus such as the steering system 1, the steering wheel circumference direction vibration is relatively small, and therefore the vibration that is transmitted to the driver from the steering wheel 2 due to disturbances input from the road surface or the like via the tie rods 5, for example, also tends to be smaller. In other words, less information tends to be transmitted to the driver from the road surface and so on as steering wheel circumference direction vibration.

Hence, the EPS control apparatus 8 according to this embodiment controls the rotary direction vibration of the steering wheel 2 to an appropriate magnitude corresponding to the operating conditions of the vehicle by controlling the EPS apparatus 6 in accordance with the operating conditions of the vehicle so as to adjust the rotary direction vibration of the steering wheel 2 (steering wheel circumference direction vibration). The EPS control apparatus 8 controls the EPS apparatus 6 so that, depending on the operating conditions of the vehicle, the rotary direction vibration of the steering wheel 2 is not reduced. Further, by allowing the steering wheel 2 to vibrate in the rotary direction and in certain cases actively increasing the rotary direction vibration of the steering wheel 2 depending on the operating conditions of the vehicle, the EPS control apparatus 8 realizes an assist characteristic and a vibration suppression performance suited to the operating conditions of the vehicle.

Here, the EPS apparatus 6 functions as an adjustment apparatus for adjusting the rotary direction vibration of the steering wheel 2, and is therefore capable of variably adjusting (modifying) a degree of transmission by which the rotary direction vibration of the steering wheel 2 is transmitted to the steering wheel 2. In other words, the EPS apparatus 6 of the steering system 1 can double as an adjustment apparatus, and therefore a constitution for adjusting the rotary direction vibration of the steering wheel 2 can be realized easily. As a result, a reduction in manufacturing cost can be achieved and the size of the apparatus can be suppressed, for example.

The EPS control apparatus 8 adjusts the rotary direction vibration of the steering wheel 2 by controlling the EPS apparatus 6 to adjust the degree by which the rotary direction vibration of the steering wheel 2 is transmitted, or in other words the degree by which vibration transmitted to the steering wheel 2 when a disturbance is input therein from the road surface or the like via the tie rods 5 is suppressed. Here, the EPS control apparatus 8 adjusts the degree by which the rotary direction vibration of the steering wheel 2 is transmitted by modifying a filter characteristic of a filter used by the EPS apparatus 6 to calculate the assist amount, such as the assist current supplied to the motor 10, in accordance with the operating conditions of the vehicle. As a result, the rotary direction vibration of the steering wheel 2 is adjusted to an appropriate magnitude for the operating conditions.

More specifically, as shown in FIG. 2, the EPS control apparatus 8 further includes a filter characteristic determination unit 18.

Parameters indicating the operating conditions of the vehicle, for example signals indicating the torque Tr detected by the torque sensor 12, a steering angle As detected by the steering angle sensor 13, a vehicle speed V detected by the vehicle speed sensor 14, and so on, are input to the filter characteristic determination unit 18. Then, on the basis of these parameters, the filter characteristic determination unit 18 determines a filter characteristic to be used in the filter calculation performed by the filter calculation unit 16.

FIG. 4 is a line diagram showing an example of filter characteristics, wherein the abscissa shows the frequency and the ordinate shows a magnitude. Here, FIG. 4 is a gain diagram showing logarithmic values of the gain at each frequency. In FIG. 4, a solid line F11 represents a first filter characteristic and a solid line F12 represents a second filter characteristic, which is different to the first filter characteristic. As regards the filter characteristic applied by the filter calculation unit 16, more vibration is passed with the second filter characteristic represented by the solid line F12 than with the first filter characteristic represented by the solid line F11.

More specifically, when the filter characteristic determination unit 18 of the steering system 1 selects the first filter characteristic represented by the solid line F11 as the filter characteristic to be applied by the filter calculation unit 16, a signal corresponding to the disturbance vibration is relatively less likely to be passed during the filter calculation performed by the filter calculation unit 16. In this case, the degree by which the steering system 1 suppresses vibration transmitted to the steering wheel 2 when a disturbance is input from the road surface or the like via the tie rods 5 increases relatively, leading to a relative reduction in the degree by which the vibration is transmitted to the steering wheel 2. As a result, a relative reduction occurs in the rotary direction vibration of the steering wheel 2 in the steering system 1, leading to a relative reduction in the vibration transmitted to the driver from the steering wheel 2, for example.

On the other hand, when the filter characteristic determination unit 18 of the steering system 1 selects the second filter characteristic represented by the solid line F12 as the filter characteristic to be applied by the filter calculation unit 16, a signal corresponding to the disturbance vibration is relatively more likely to be passed during the filter calculation performed by the filter calculation unit 16. In this case, the degree by which the steering system 1 suppresses vibration transmitted to the steering wheel 2 when a disturbance is input from the road surface or the like via the tie rods 5 decreases relatively, leading to a relative increase in the degree by which the vibration is transmitted to the steering wheel 2. As a result, the steering wheel 2 is allowed to vibrate in the rotary direction, leading to a relative increase in rotary direction vibration in the steering system 1, and accordingly, a relative increase occurs in the vibration transmitted to the driver from the steering wheel 2, for example.

Here, as shown in FIG. 4, the filter characteristic determination unit 18 is capable of switching the filter characteristic applied by the filter calculation unit 16 in two stages, i.e. between the first filter characteristic represented by the solid line F11 and the second filter characteristic represented by the solid line F12. The filter characteristic determination unit 18 switches between the first filter characteristic represented by the solid line F11 and the second filter characteristic represented by the solid line F12 on the basis of the parameters indicating the operating conditions of the vehicle, for example the torque Tr detected by the torque sensor 12, the steering angle As detected by the steering angle sensor 13, the vehicle speed V detected by the vehicle speed sensor 14, and so on.

Hence, the steering system 1 can vary the vibration transmitted to the driver from the steering wheel 2 in accordance with the operating conditions by executing control in which the EPS control apparatus 8 controls the EPS apparatus 6 to adjust the rotary direction vibration of the steering wheel 2. As a result, with the steering system 1, the driving feeling imparted to the driver can be varied in accordance with the operating conditions of the vehicle, and therefore a more appropriate driving feeling can be realized in accordance with the operating conditions of the vehicle and so on. In the steering system 1, by having the EPS control apparatus 8 control the EPS apparatus 6 to allow the steering wheel 2 to vibrate in the rotary direction, or in other words by relatively increasing the vibration transmitted to the driver from the steering wheel 2, depending on the operating conditions of the vehicle, an amount of information transmitted to the driver from the road surface and so on as the rotary direction vibration of the steering wheel 2 can be relatively increased. Hence, by having the EPS control apparatus 8 control the EPS apparatus 6 to adjust the rotary direction vibration of the steering wheel 2 in accordance with the operating conditions, the steering system 1 can ensure that a sufficient amount of vibration required to grasp a road surface condition and so on is transmitted to the steering wheel 2, while blocking unnecessary vibration where appropriate. Further, the steering system 1 can provide the driver with information relating to operating conditions such as the road surface condition through the rotary direction vibration of the steering wheel 2, and as a result, so-called road information such as the road surface condition can be transmitted to the driver.

The EPS control apparatus 8 preferably adjusts the rotary direction vibration of the steering wheel 2 in accordance with the vehicle speed. In this case, the rotary direction vibration of the steering wheel 2 is preferably adjusted such that vibration on a relatively high vehicle speed side is greater than vibration on a relatively low vehicle speed side. In other words, the EPS control apparatus 8 controls the EPS apparatus 6 to increase the steering wheel circumference direction vibration in a case where the vehicle speed of the vehicle provided with the steering wheel 2 is relatively high relative to the steering wheel circumference direction vibration in a case where the vehicle speed is relatively low.

More specifically, when the vehicle speed V detected by the vehicle speed sensor 14 is higher than a preset first predetermined value, for example, the filter characteristic determination unit 18 selects the second filter characteristic (solid line F12) as the filter characteristic to be applied by the filter calculation unit 16, and when the vehicle speed V is equal to or lower than the first predetermined value, the filter characteristic determination unit 18 selects the first filter characteristic (solid line F11) as the filter characteristic. Here, the first predetermined value is a determination value set with respect to the vehicle speed V detected by the vehicle speed sensor 14. The first predetermined value is set in advance on the basis of experiments and so on in accordance with a relationship between the vehicle speed and the driving feeling imparted to the driver by the vibration transmitted to the steering wheel 2, and so on. As a result, the steering system 1 can relatively increase the amount of vibration transmitted to the driver from the steering wheel 2 when the vehicle is traveling at a comparatively high speed, enabling a relative increase in the amount of information transmitted to the driver in the form of vibration from the road surface or the like. When the vehicle is traveling at a comparatively low speed, on the other hand, the steering system 1 can relatively reduce the amount of vibration transmitted to the driver from the steering wheel 2, and therefore the driver can be prevented from feeling discomfort due to disturbance vibration from the road surface or the like.

Further, the EPS control apparatus 8 may adjust the rotary direction vibration of the steering wheel 2 in accordance with the torque acting on the steering wheel 2. For example, the rotary direction vibration of the steering wheel 2 is preferably adjusted such that the amount of vibration in a case where the torque acting on the steering wheel 2 is relatively large is greater than the amount of vibration in a case where the torque is relatively small. In other words, the EPS control apparatus 8 controls the EPS apparatus 6 to increase the steering wheel circumference direction vibration in a case where the torque acting on the steering wheel 2 is relatively large relative to the steering wheel circumference direction vibration in a case where the torque acting on the steering wheel 2 is relatively small.

More specifically, when the torque Tr detected by the torque sensor 12 is larger than a preset second predetermined value, the filter characteristic determination unit 18 selects the second filter characteristic (solid line F12) as the filter characteristic to be applied by the filter calculation unit 16, and when the torque Tr detected by the torque sensor 12 is equal to or smaller than the second predetermined value, the filter characteristic determination unit 18 selects the first filter characteristic (solid line F11) as the filter characteristic. Here, the second predetermined value is a determination value set with respect to the torque Tr detected by the torque sensor 12. The second predetermined value is set in advance on the basis of experiments and so on in accordance with a relationship between the torque and the driving feeling imparted to the driver by the vibration transmitted to the steering wheel 2, and so on. As a result, the steering system 1 can relatively increase the amount of vibration transmitted to the driver from the steering wheel 2 when the steering torque input into the steering wheel 2 from the driver is comparatively large, for example during steering retention in which the steering wheel 2 is held in a specific position, or the like, enabling a relative increase in the amount of information transmitted to the driver in the form of vibration from the road surface or the like. When the steering torque input into the steering wheel 2 from the driver is comparatively small, on the other hand, the steering system 1 can relatively reduce the amount of vibration transmitted to the driver from the steering wheel 2, and therefore the driver can be prevented from feeling discomfort due to disturbance vibration from the road surface or the like.

The EPS control apparatus 8 may also adjust the rotary direction vibration of the steering wheel 2 in accordance with the steering angle of the steering wheel 2. In this case, the rotary direction vibration of the steering wheel 2 is preferably adjusted such that the amount of vibration in a case where the steering angle of the steering wheel 2 is relatively large is greater than the amount of vibration in a case where the steering angle is relatively small. In other words, the EPS control apparatus 8 controls the EPS apparatus 6 to increase the steering wheel circumference direction vibration in a case where the steering angle of the steering wheel 2 is relatively large relative to the steering wheel circumference direction vibration in a case where the steering angle of the steering wheel 2 is relatively small.

More specifically, for example, when the steering angle As detected by the steering angle sensor 13 is larger than a preset third predetermined value, the filter characteristic determination unit 18 selects the second filter characteristic (solid line F12) as the filter characteristic to be applied by the filter calculation unit 16, and when the steering angle As detected by the steering angle sensor 13 is equal to or smaller than the third predetermined value, the filter characteristic determination unit 18 selects the first filter characteristic (solid line F11) as the filter characteristic. Here, the third predetermined value is a determination value set with respect to the steering angle As detected by the steering angle sensor 13. The third predetermined value is set in advance on the basis of experiments and so on in accordance with a relationship between the steering angle of the steering wheel 2 and the driving feeling imparted to the driver by the vibration transmitted to the steering wheel 2, and so on. As a result, the steering system 1 can relatively increase the amount of vibration transmitted to the driver from the steering wheel 2 when the steering angle of the steering wheel 2 is comparatively large, for example when the steering wheel 2 is turned forward and back to cause the vehicle to turn or the like, and therefore the amount of information transmitted to the driver in the form of vibration from the road surface or the like can be relatively increased. When the steering angle of the steering wheel 2 is comparatively small, for example when the vehicle travels in a straight line or the like, on the other hand, the steering system 1 can relatively reduce the amount of vibration transmitted to the driver from the steering wheel 2. As a result, so-called flutter, brake vibration, and so on can be suppressed appropriately.

The EPS control apparatus 8 may also adjust the rotary direction vibration of the steering wheel 2 in accordance with a steering angle velocity of the steering wheel 2. In this case, the filter characteristic determination unit 18 selects the second filter characteristic (solid line F12) as the filter characteristic to be applied by the filter calculation unit 16 when the steering angle velocity of the steering wheel 2 is larger than a preset fourth predetermined value, for example, and selects the first filter characteristic (solid line F11) as the filter characteristic when the steering angle velocity of the steering wheel 2 is equal to or smaller than the fourth predetermined value.

Note that in the above description, the filter characteristic determination unit 18 is capable of switching the filter characteristic in two stages (between two types). However, the invention is not limited thereto, and the filter characteristic determination unit 18 may switch the filter characteristic in three or more stages (between three or more types). Further, the filter characteristic determination unit 18 may set the filter characteristic as a function having the parameters indicating the operating conditions of the vehicle, for example the torque Tr detected by the torque sensor 12, the steering angle As detected by the steering angle sensor 13, the vehicle speed V detected by the vehicle speed sensor 14, and so on as variables, and modify the filter characteristic continuously in accordance with these parameters.

Next, an example of the control executed by the EPS control apparatus 8 will be described with reference to a flowchart in FIG. 5. Note that these control routines are executed repeatedly at control period intervals of several hundreds of μs to several tens of ms.

First, on the basis of the various detection results obtained by the condition detection apparatus 7, the EPS control apparatus 8 obtains the vehicle speed V of the vehicle installed with the steering system 1, the torque Tr acting on the steering wheel 2, the steering angle As of the steering wheel 2, and a steering angle velocity dAs of the steering wheel 2 (ST1).

Next, the EPS control apparatus 8 compares the vehicle speed V obtained in ST1 with a preset first predetermined value T1 to determine whether or not the vehicle speed V is higher than the first predetermined value T1 (ST2).

When the vehicle speed V is determined to be higher than the first predetermined value T1 (ST2: Yes), the EPS control apparatus 8 compares the torque Tr obtained in ST1 with a preset second predetermined value T2 to determine whether or not the torque Tr is larger than the second predetermined value T2 (ST3).

When the EPS control apparatus 8 determines that the torque Tr is larger than the second predetermined value T2 (ST3: Yes), the filter characteristic determination unit 18 selects the second filter characteristic represented by the solid line F12 in FIG. 4 as the filter characteristic to be applied by the filter calculation unit 16 (ST4). The current control period is then terminated, whereupon the routine advances to the next control period. As a result, the steering system 1 can relatively increase the vibration transmitted to the driver from the steering wheel 2.

When the torque Tr is determined to be equal to or smaller than the second predetermined value T2 in ST3 (ST3: No), the EPS control apparatus 8 compares the steering angle As obtained in ST1 with a preset third predetermined value T3 to determine whether or not the steering angle As is larger than the third predetermined value T3 (ST5).

When the steering angle As is determined to be larger than the third predetermined value T3 (ST5: Yes), the EPS control apparatus 8 compares the steering angle velocity dAs obtained in ST1 with a preset fourth predetermined value T4 to determine whether or not the steering angle velocity dAs is larger than the fourth predetermined value T4 (ST6).

When the EPS control apparatus 8 determines that the steering angle velocity dAs is larger than the fourth predetermined value T4 (ST6: Yes), the routine advances to ST4 described above. As a result, the steering system 1 can relatively increase the vibration transmitted to the driver from the steering wheel 2.

When the EPS control apparatus 8 determines that the vehicle speed V is equal to or lower than the first predetermined value T1 in ST2 (ST2: No), or determines that the steering angle As is equal to or smaller than the third predetermined value T3 in ST5 (ST5: No), or determines that the steering angle velocity dAs is equal to or smaller than the fourth predetermined value T4 in ST6 (ST6: No), the filter characteristic determination unit 18 selects the first filter characteristic represented by the solid line F11 in FIG. 4 as the filter characteristic to be applied by the filter calculation unit 16 (ST7). The current control period is then terminated, whereupon the routine advances to the next control period. As a result, the steering system 1 can relatively reduce the vibration transmitted to the driver from the steering wheel 2.

The steering system 1 according to the embodiment described above includes the steering wheel 2, which is provided in the vehicle and configured to be rotated, the EPS apparatus 6 that adjusts the rotary direction vibration of the steering wheel 2, and the EPS control apparatus 8 that controls the EPS apparatus 6, in accordance with the operating conditions of the vehicle, in order to adjust the rotary direction vibration of the steering wheel 2. By having the steering system 1 and the EPS control apparatus 8 adjust the rotary direction vibration of the steering wheel 2 by controlling the EPS apparatus 6, the driving feeling imparted to the driver can be varied in accordance with the operating conditions of the vehicle.

Second Embodiment

Figure 6:
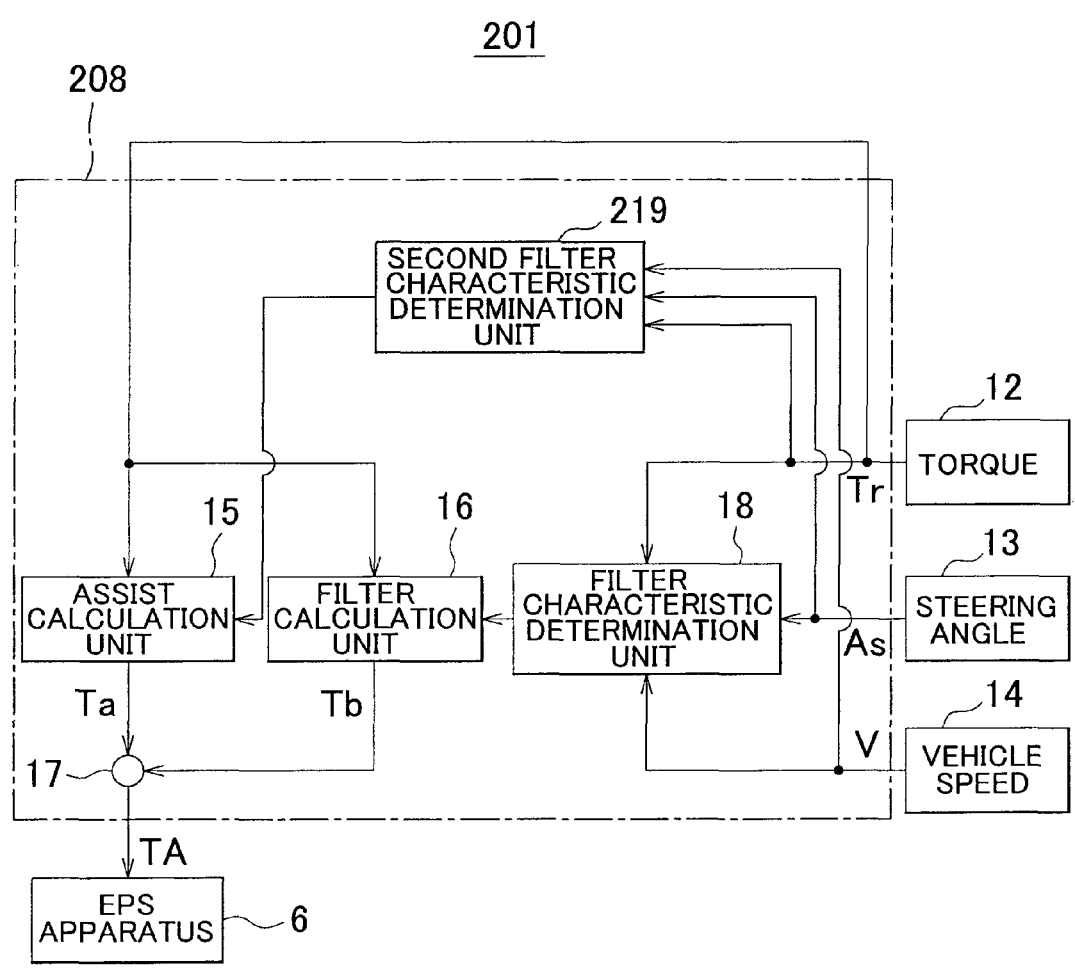
FIG. 6 is a block diagram showing an outline of the constitution of an EPS control apparatus according to a second embodiment.

FIG. 6 is a block diagram showing an outline of the constitution of an EPS control apparatus according to a second embodiment. The steering system and steering control apparatus according to the second embodiment differ from those of the first embodiment in including a second filter characteristic determination unit. As regards constitutions, actions, and effects that are shared with the above embodiment, duplicate description has been omitted where possible and identical reference numerals have been attached (likewise in the embodiments to be described below).

A steering system 201 according to this embodiment, shown in FIG. 6, includes an EPS control apparatus 208 serving as a steering control apparatus in place of the EPS control apparatus 8. The EPS control apparatus 208 includes, in addition to the assist calculation unit 15, filter calculation unit 16, final assist amount calculation unit 17, and filter characteristic determination unit 18, a second filter characteristic determination unit 219 that differs from the filter characteristic determination unit 18.

The filter characteristic determination unit 18 described above is a filter characteristic determination unit for a filter calculation, which determines the filter characteristic to be used in the filter calculation performed by the filter calculation unit 16. The second filter characteristic determination unit 219, on the other hand, is a filter characteristic determination unit for an assist calculation, which determines a filter characteristic to be used in the assist calculation performed by the assist calculation unit 15. Filter characteristics applied by the assist calculation unit 15 in a plurality of stages (types) are substantially identical to the filter characteristics applied by the filter calculation unit 16, and therefore description of these filter characteristics has been omitted.

Substantially identically to the filter characteristic determination unit 18, parameters indicating the operating conditions of the vehicle, for example signals indicating the torque Tr detected by the torque sensor 12, the steering angle As detected by the steering angle sensor 13, the vehicle speed V detected by the vehicle speed sensor 14, and so on, are input to the second filter characteristic determination unit 219. The second filter characteristic determination unit 219 determines the filter characteristic to be applied to a torque signal corresponding to the torque Tr detected by the torque sensor 12 in the assist calculation unit 15 on the basis of these parameters. As a result, the steering system 201 and EPS control apparatus 208 according to this embodiment can achieve improvements in adjustment control precision and responsiveness with regard to the magnitude of the rotary direction vibration of the steering wheel 2.

Third Embodiment

Figures 7, 8:
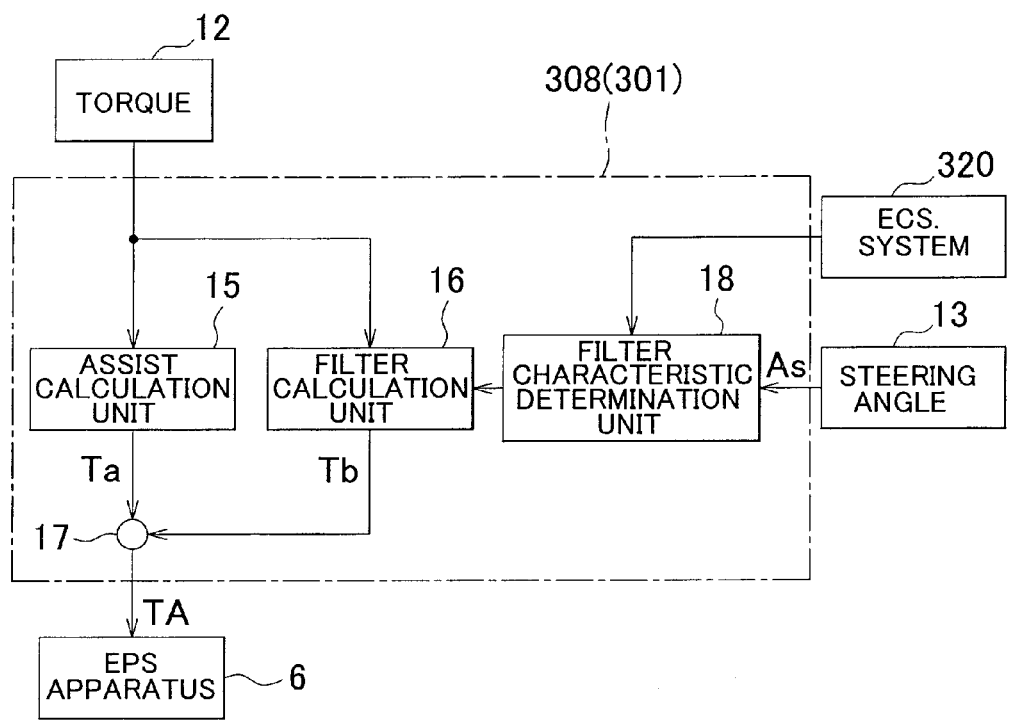
FIG. 7 is a block diagram showing an outline of the constitution of an EPS control apparatus according to a third embodiment.
FIG. 8 is a view showing an example of a filter characteristic setting map for a steering system according to the third embodiment.
Figure 9:
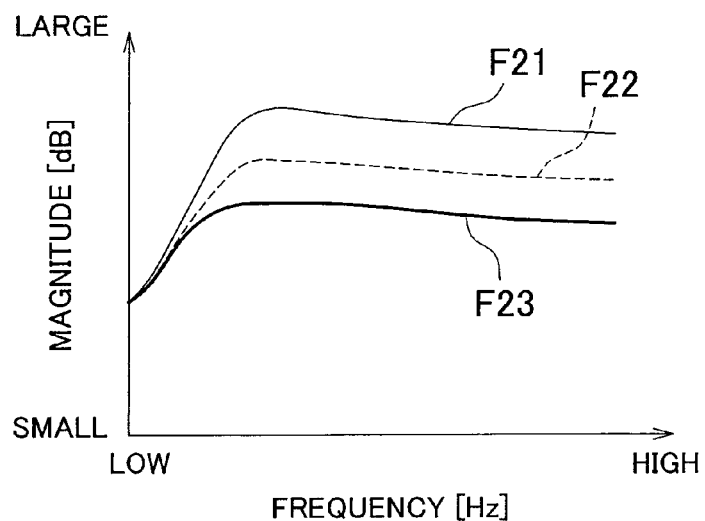
FIG. 9 is a line diagram showing an example of filter characteristics of the steering system according to the third embodiment.

FIG. 7 is a block diagram showing an outline of the constitution of an EPS control apparatus according to a third embodiment. FIG. 8 is a view showing an example of a filter characteristic setting map for a steering system according to the third embodiment. FIG. 9 is a line diagram showing an example of filter characteristics of the steering system according to the third embodiment. The steering system and steering control apparatus according to the third embodiment differ from those of the first embodiment in that vibration is adjusted in accordance with a driving tendency of the driver in driving the vehicle. The driving tendency means, for example, a style or a manner of the driver in driving the vehicle.

A steering system 301 according to this embodiment, shown in FIG. 7, includes an EPS control apparatus 308 serving as the steering control apparatus. The EPS control apparatus 308 adjusts the rotary direction vibration of the steering wheel 2 in accordance with the driving tendency of the driver in driving the vehicle. The EPS control apparatus 308 controls the EPS apparatus 6 to vary the magnitude of the rotary direction vibration of the steering wheel 2 in accordance with the driving tendency of the driver in driving the vehicle.

For example, the EPS control apparatus 308 classifies driving tendencies of the driver in driving the vehicle, which in one of the operating conditions of the vehicle, on the basis of detection signals from the various sensors and an operating condition and so on of another apparatus, and varies the magnitude of the rotary direction vibration of the steering wheel 2 on the basis of the driving tendency. In other words, the EPS control apparatus 308 varies the magnitude of the rotary direction vibration of the steering wheel 2 on the basis of the operating condition and so on of the other apparatus, for example. Here, for example, the EPS control apparatus 308 varies the magnitude of the rotary direction vibration of the steering wheel 2 by modifying the filter characteristic applied by the filter calculation unit 16 on the basis of the operating condition and so on of a damping force control suspension system (an Adaptive Variable Suspension System (AVS), for example; to be described hereafter as an "electronic control suspension system (ECS system) unless otherwise noted) 320 serving as the other apparatus.

Here, the ECS system 320 varies a passenger comfort and a traveling performance of the vehicle by varying a damping force characteristic of a shock absorber for a suspension that absorbs input into a vehicle wheel of the vehicle from the road surface. The ECS system 320 is capable of selecting one of a plurality of set modes, for example a sport mode, a normal mode, a comfort mode, and so on, arbitrarily in accordance with the driving tendency of the driver. The damping force characteristic is then modified in accordance with the selected set mode.

Hence, the EPS control apparatus 308 according to this embodiment varies the magnitude of the rotary direction vibration of the steering wheel 2 in accordance with the set mode of the ECS system 320, which serves as an operating condition of the vehicle, or in other words in accordance with the driving tendency of the driver corresponding to the set mode. Parameters indicating the operating conditions of the vehicle, for example a signal indicating the set mode of the ECS system 320 and a signal indicating the steering angle As detected by the steering angle sensor 13, are input to the filter characteristic determination unit 18. Then, the filter characteristic determination unit 18 determines the filter characteristic to be used in the filter calculation performed by the filter calculation unit 16 on the basis of these parameters.

For example, the filter characteristic determination unit 18 switches the filter characteristic used in the filter calculation of the filter calculation unit 16 on the basis of the set mode of the ECS system 320 and the steering angle As detected by the steering angle sensor 13 by referring to a map shown in FIG. 8. Here, as shown in FIGS. 8 and 9, the filter characteristic determination unit 18 is capable of switching the filter characteristic applied by the filter calculation unit 16 in three stages in accordance with the operating conditions. In FIG. 9, a solid line F21 represents a first filter characteristic, a dotted line F22 represents a second filter characteristic, and a solid line F23 represents a third filter characteristic.

Of the filter characteristics applied by the filter calculation unit 16, the third filter characteristic represented by the solid line F23 is a characteristic with which vibration is most likely to be transmitted and the first filter characteristic represented by the solid line F21 is a characteristic with which vibration is least likely to be transmitted. Hence, when the third filter characteristic represented by the solid line F23 is selected as the filter characteristic to be applied by the filter calculation unit 16 in the steering system 301, the rotary direction vibration of the steering wheel 2 is maximized, whereby a maximum amount of vibration is transmitted to the driver from the steering wheel 2.

As shown in FIG. 8, when the sport mode is selected as the set mode of the ECS system 320, or in other words when a sport driving tendency is relatively high, the filter characteristic determination unit 18 selects the filter characteristic with which vibration is relatively likely to be transmitted. When the comfort mode is selected as the set mode of the ECS system 320, or in other words when the sport driving tendency is relatively low, on the other hand, the filter characteristic determination unit 18 selects the filter characteristic with which vibration is relatively unlikely to be transmitted. Further, when the vehicle turns, i.e. when the steering angle As detected by the steering angle sensor 13 typically equals or exceeds a preset turn predetermined value, the filter characteristic determination unit 18 selects the filter characteristic with which vibration is relatively likely to be transmitted. When the vehicle travels in a straight line, i.e. when the steering angle As detected by the steering angle sensor 13 is typically smaller than the preset turn predetermined value, on the other hand, the filter characteristic determination unit 18 selects the filter characteristic with which vibration is relatively unlikely to be transmitted.

As a result, when the sport mode is selected as the set mode of the ECS system 320, or in other words when the sport driving tendency is relatively high, the steering system 301 can relatively increase the amount of vibration transmitted to the driver from the steering wheel 2, and therefore a relatively large amount of information can be transmitted to the driver from the road surface or the like in the form of vibration. When the comfort mode is selected as the set mode of the ECS system 320, or in other words when the sport driving tendency is relatively low, on the other hand, the steering system 301 can relatively reduce the amount of vibration transmitted to the driver from the steering wheel 2, and therefore the driver can be prevented from feeling discomfort due to disturbance vibration from the road surface or the like.

Hence, the steering system 301 and the EPS control apparatus 308 can control the EPS apparatus 6 to adjust the rotary direction vibration of the steering wheel 2 in accordance with the driving tendency of the driver in driving the vehicle, in this case in accordance with the set mode of the ECS system 320, and as a result, the driving feeling imparted to the driver can be varied in accordance with the driving tendency of the driver, in this case the set mode of the ECS system 320.

Fourth Embodiment

Figure 10:
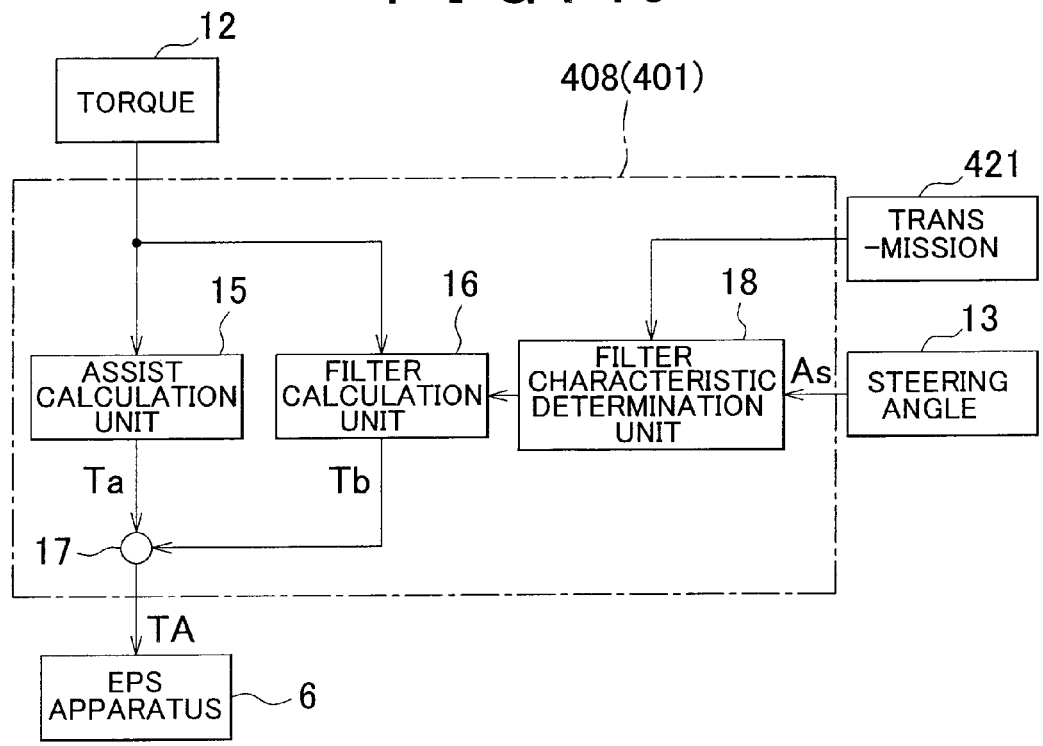
FIG. 10 is a block diagram showing an outline of the constitution of an EPS control apparatus according to a fourth embodiment.
Figures 11, 12:
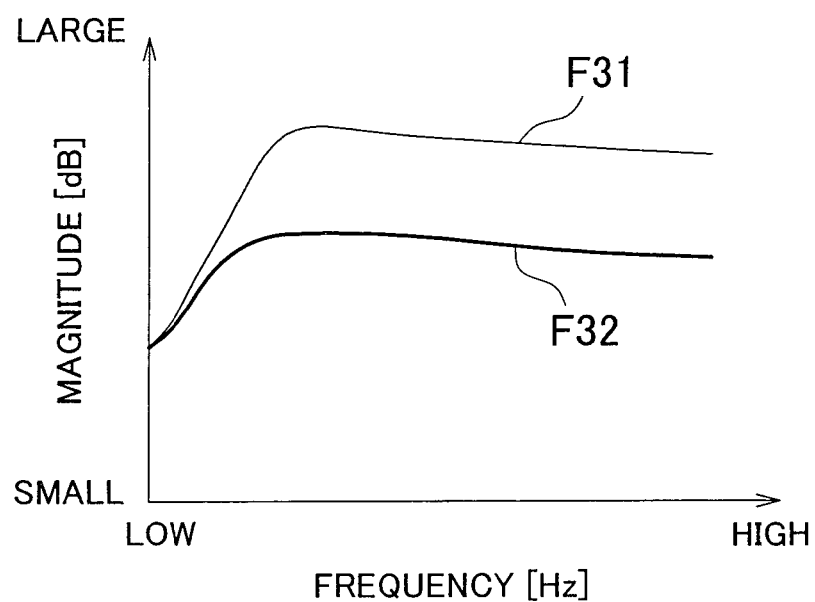
FIG. 11 is a view showing an example of a filter characteristic setting map for a steering system according to the fourth embodiment.
FIG. 12 is a line diagram showing an example of filter characteristics of the steering system according to the fourth embodiment.

FIG. 10 is a block diagram showing an outline of the constitution of an EPS control apparatus according to a fourth embodiment. FIG. 11 is a view showing an example of a filter characteristic setting map for a steering system according to the fourth embodiment. FIG. 12 is a line diagram showing an example of filter characteristics of the steering system according to the fourth embodiment. The steering system and steering control apparatus according to the fourth embodiment differ from those of the third embodiment in that vibration is adjusted in accordance with an operating condition of a transmission.

A steering system 401 according to this embodiment, shown in FIG. 10, includes an EPS control apparatus 408 serving as the steering control apparatus. The EPS control apparatus 408 adjusts the rotary direction vibration of the steering wheel 2 in accordance with the driving tendency of the driver in driving the vehicle on the basis of an operating condition and so on of another apparatus. Here, the EPS control apparatus 408 varies the magnitude of the rotary direction vibration of the steering wheel 2 by modifying the filter characteristic applied by the filter calculation unit 16 on the basis of the operating condition and so on of a transmission 421 serving as the other apparatus.

The transmission 421 is provided on a power transmission path between a travel power supply and a drive wheel of the vehicle in order to shift a rotary output of the travel power supply and transmit the shifted output to the drive wheel side. Various conventional constitutions, for example a manual transmission (MT), a stepped automatic transmission (AT), a continuously variable transmission (CVT), a multimode manual transmission (MMT), a sequential manual transmission (SMT), a dual clutch transmission (DCT), and so on, may be used as the transmission 421. Here, the transmission 421 is capable of selecting a plurality of shift modes, for example an AT mode (automatic shift mode), an MT mode (manual shift mode), and so on, in accordance with the driving tendency of the driver.

Hence, the EPS control apparatus 408 according to this embodiment varies the magnitude of the rotary direction vibration of the steering wheel 2 in accordance with the shift mode of the transmission 421, which serves as an operating condition of the vehicle, or in other words in accordance with the driving tendency of the driver corresponding to the shift mode. Parameters indicating the operating conditions of the vehicle, for example a signal indicating the shift mode of the transmission 421 and a signal indicating the steering angle As detected by the steering angle sensor 13, are input to the filter characteristic determination unit 18. Then, the filter characteristic determination unit 18 determines the filter characteristic to be used in the filter calculation performed by the filter calculation unit 16 on the basis of these parameters.

For example, the filter characteristic determination unit 18 switches the filter characteristic used in the filter calculation of the filter calculation unit 16 on the basis of the shift mode of the transmission 421 and the steering angle As detected by the steering angle sensor 13 by referring to a map shown in FIG. 11. Here, as shown in FIGS. 11 and 12, the filter characteristic determination unit 18 is capable of switching the filter characteristic applied by the filter calculation unit 16 in two stages in accordance with the operating conditions. In FIG. 12, a solid line F31 represents a first filter characteristic and a solid line F32 represents a second filter characteristic.

Of the filter characteristics applied by the filter calculation unit 16, the second filter characteristic represented by the solid line F32 is a characteristic with which vibration is more likely to be transmitted and the first filter characteristic represented by the solid line F31 is a characteristic with which vibration is less likely to be transmitted. Hence, when the second filter characteristic represented by the solid line F32 is selected as the filter characteristic to be applied by the filter calculation unit 16 in the steering system 401, the rotary direction vibration of the steering wheel 2 is increased relatively such that a relatively large amount of vibration is transmitted to the driver from the steering wheel 2, for example.

As shown in FIG. 11, when the MT mode is selected as the shift mode of the transmission 421, or in other words when the sport driving tendency is relatively high and the vehicle is performing a turn, the filter characteristic determination unit 18 selects the filter characteristic with which vibration is relatively likely to be transmitted. On the other hand, when the MT mode is selected as the shift mode of the transmission 421 and the vehicle is traveling in a straight line, or when the AT mode is selected as the shift mode of the transmission 421, i.e. when the sport driving tendency is relatively low, the filter characteristic determination unit 18 selects the filter characteristic with which vibration is relatively unlikely to be transmitted.

As a result, when the MT mode is selected as the shift mode of the transmission 421, or in other words when the sport driving tendency is relatively high and the vehicle is performing a turn, the steering system 401 can relatively increase the amount of vibration transmitted to the driver from the steering wheel 2, and therefore a relatively large amount of information can be transmitted to the driver from the road surface or the like in the form of vibration. When the AT mode is selected as the shift mode of the transmission 421, for example, or in other words when the sport driving tendency is relatively low, on the other hand, the steering system 401 can relatively reduce the amount of vibration transmitted to the driver from the steering wheel 2, and therefore the driver can be prevented from feeling discomfort due to disturbance vibration from the road surface or the like, for example.

Hence, the steering system 401 and the EPS control apparatus 408 can control the EPS apparatus 6 to adjust the rotary direction vibration of the steering wheel 2 in accordance with the driving tendency of the driver in driving the vehicle, in this case in accordance with the shift mode of the transmission 421, and as a result, the driving feeling imparted to the driver can be varied in accordance with the driving tendency of the driver, in this case the shift mode of the transmission 421.

Fifth Embodiment

Figures 13, 14:
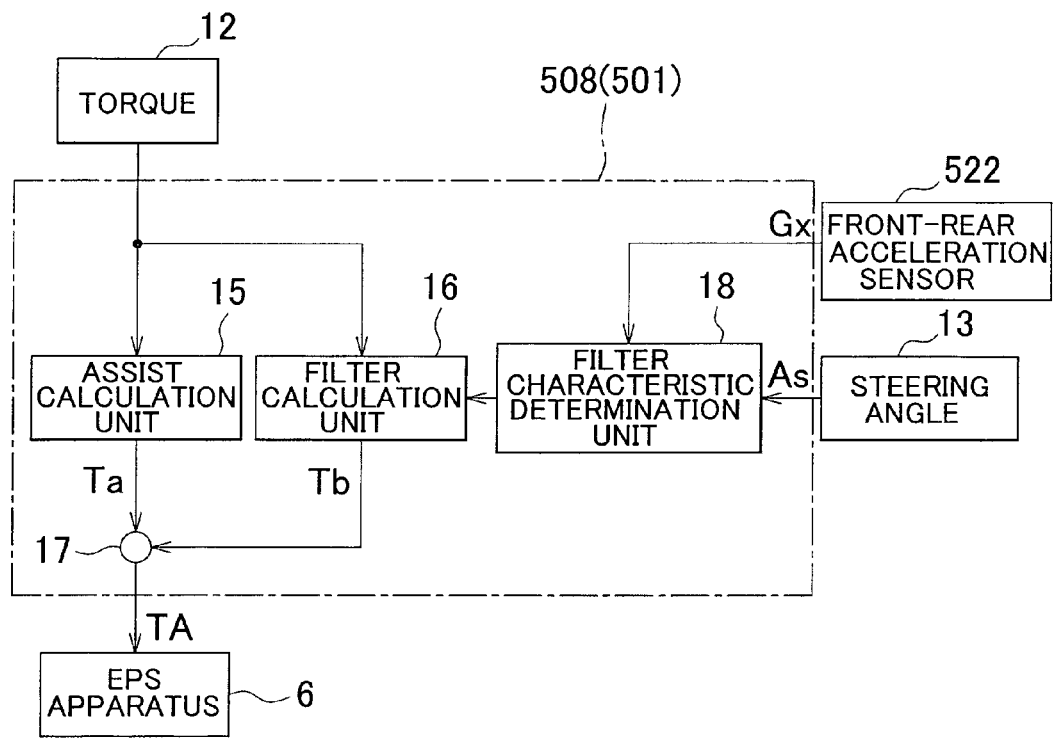
FIG. 13 is a block diagram showing an outline of the constitution of an EPS control apparatus according to a fifth embodiment.
FIG. 14 is a view showing an example of a filter characteristic setting map for a steering system according to the fifth embodiment.
Figure 15:
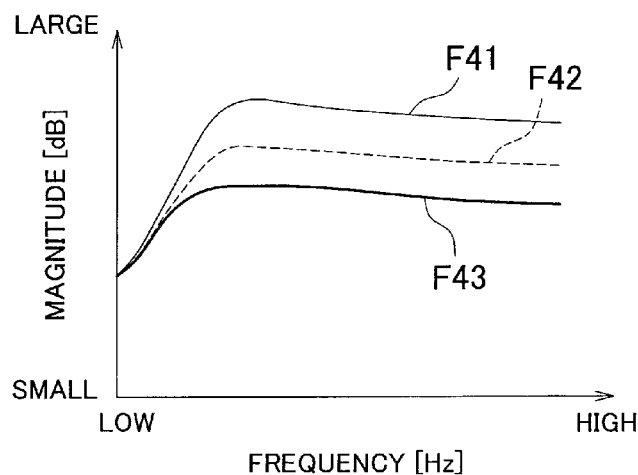
FIG. 15 is a line diagram showing an example of filter characteristics of the steering system according to the fifth embodiment.

FIG. 13 is a block diagram showing an outline of the constitution of an EPS control apparatus according to a fifth embodiment. FIG. 14 is a view showing an example of a filter characteristic setting map for a steering system according to the fifth embodiment. FIG. 15 is a line diagram showing an example of filter characteristics of the steering system according to the fifth embodiment. The steering system and steering control apparatus according to the fifth embodiment differ from those of the first embodiment in that vibration is adjusted in accordance with an absolute value of an acceleration acting on the vehicle.

A steering system 501 according to this embodiment, shown in FIG. 13, includes an EPS control apparatus 508 serving as the steering control apparatus. The EPS control apparatus 508 adjusts the rotary direction vibration of the steering wheel 2 in accordance with the absolute value of the acceleration acting on the vehicle. The EPS control apparatus 508 controls the EPS apparatus 6 to vary the magnitude of the rotary direction vibration of the steering wheel 2 in accordance with the absolute value of the acceleration acting on the vehicle.

Here, the EPS control apparatus 508 varies the magnitude of the rotary direction vibration of the steering wheel 2 by modifying the filter characteristic applied by the filter calculation unit 16 on the basis of a detection signal from a front-rear acceleration sensor 522 that detects a front-rear direction (travel direction) acceleration Gx acting on the vehicle, which is an parameter representing an operating condition of the vehicle, or in other words a behavior of the vehicle. Hence, the EPS control apparatus 508 according to this embodiment varies the magnitude of the rotary direction vibration of the steering wheel 2 in accordance with the front-rear direction acceleration Gx of the vehicle, detected by the front-rear acceleration sensor 522.

Parameters indicating the operating conditions of the vehicle, for example, a signal indicating the front-rear direction acceleration Gx of the vehicle detected by the front-rear acceleration sensor 522 and a signal indicating the steering angle As detected by the steering angle sensor 13 are input to the filter characteristic determination unit 18. Then, the filter characteristic determination unit 18 determines the filter characteristic to be used in the filter calculation performed by the filter calculation unit 16 on the basis of these parameters.

For example, the filter characteristic determination unit 18 switches the filter characteristic used in the filter calculation of the filter calculation unit 16 on the basis of the front-rear direction acceleration Gx of the vehicle detected by the front-rear acceleration sensor 522 and the steering angle As detected by the steering angle sensor 13 by referring to a map shown in FIG. 14. Here, as shown in FIGS. 14 and 15, the filter characteristic determination unit 18 is capable of switching the filter characteristic applied by the filter calculation unit 16 in three stages in accordance with the operating conditions. In FIG. 15, a solid line F41 represents a first filter characteristic, a dotted line F42 represents a second filter characteristic, and a solid line F43 represents a third filter characteristic.

Of the filter characteristics applied by the filter calculation unit 16, the third filter characteristic represented by the solid line F43 is a characteristic with which vibration is most likely to be transmitted and the first filter characteristic represented by the solid line F41 is a characteristic with which vibration is least likely to be transmitted. Hence, when the third filter characteristic represented by the solid line F43 is selected as the filter characteristic to be applied by the filter calculation unit 16 in the steering system 401, the rotary direction vibration of the steering wheel 2 is maximized, whereby a maximum amount of vibration is transmitted to the driver from the steering wheel 2, for example.

As shown in FIG. 14, when a deceleration of the vehicle is high such that the front-rear direction acceleration Gx of the vehicle detected by the front-rear acceleration sensor 522 is typically negative and an absolute value thereof equals or exceeds a preset first front-rear G predetermined value, the filter characteristic determination unit 18 selects the filter characteristic with which vibration is relatively likely to be transmitted. When the deceleration of the vehicle is low such that the front-rear direction acceleration Gx of the vehicle detected by the front-rear acceleration sensor 522 is typically negative but the absolute value thereof is smaller than the preset first front-rear G predetermined value, the filter characteristic determination unit 18 selects the filter characteristic with which vibration is relatively unlikely to be transmitted. The filter characteristic determination unit 18 also selects a filter characteristic with which vibration is relatively unlikely to be transmitted when the vehicle is at an even higher deceleration where brake vibration becomes problematic such that the front-rear direction acceleration Gx of the vehicle detected by the front-rear acceleration sensor 522 is typically negative and the absolute value thereof equals or exceeds a second front-rear G predetermined value that is larger than the preset first front-rear G predetermined value. Further, when the vehicle turns, the filter characteristic determination unit 18 selects a filter characteristic with which vibration is relatively more likely to be transmitted than when the vehicle travels in a straight line. When the vehicle travels in a straight line, on the other hand, the filter characteristic determination unit 18 selects a filter characteristic with which vibration is relatively less likely to be transmitted than when the vehicle turns.

As a result, when the deceleration of the vehicle is high such that the front-rear direction acceleration of the vehicle is negative and the absolute value thereof is relatively large, for example, the steering system 501 can relatively increase the amount of vibration transmitted to the driver from the steering wheel 2, and therefore a relatively large amount of information can be transmitted to the driver from the road surface or the like in the form of vibration. On the other hand, when the deceleration of the vehicle is low such that the front-rear direction acceleration of the vehicle is negative but the absolute value thereof is relatively small, for example, the steering system 501 can relatively reduce the amount of vibration transmitted to the driver from the steering wheel 2, and therefore the driver can be prevented from feeling discomfort due to disturbance vibration from the road surface or the like. Furthermore, when the vehicle is at an even higher deceleration where brake vibration becomes problematic, for example, the steering system 501 can suppress discomfort caused by brake vibration or unnecessary rotary direction vibration of the steering wheel 2.

Hence, the steering system 501 and the EPS control apparatus 508 can control the EPS apparatus 6 to increase the rotary direction vibration of the steering wheel 2 when the absolute value of the acceleration acting on the vehicle is relatively large relative to the rotary direction vibration of the steering wheel 2 when the absolute value of the acceleration is relatively small, and as a result, the driving feeling imparted to the driver can be varied appropriately in accordance with the acceleration acting on the vehicle.

Note that as the parameter corresponding to the front-rear direction (travel direction) acceleration acting on the vehicle, the EPS control apparatus 508 may use a pedal depression force, a brake pressure (a so-called wheel cylinder pressure), or the like acting on a brake pedal of the vehicle, for example, instead of the front-rear direction acceleration Gx detected by the front-rear acceleration sensor 522.

Sixth Embodiment

Figure 16:
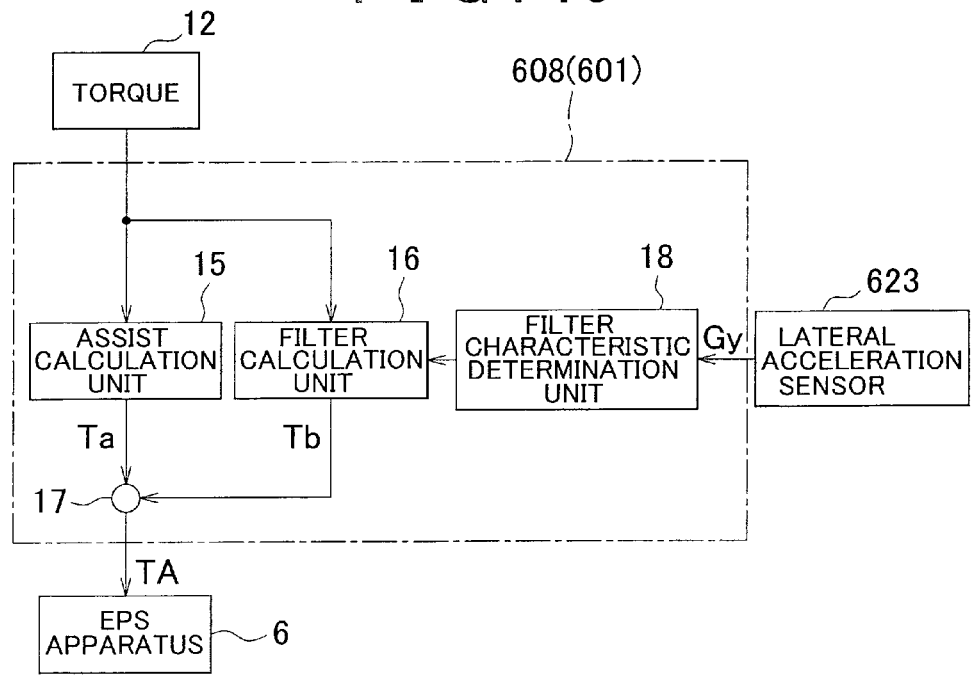
FIG. 16 is a block diagram showing an outline of the constitution of an EPS control apparatus according to a sixth embodiment.
Figures 17, 18:
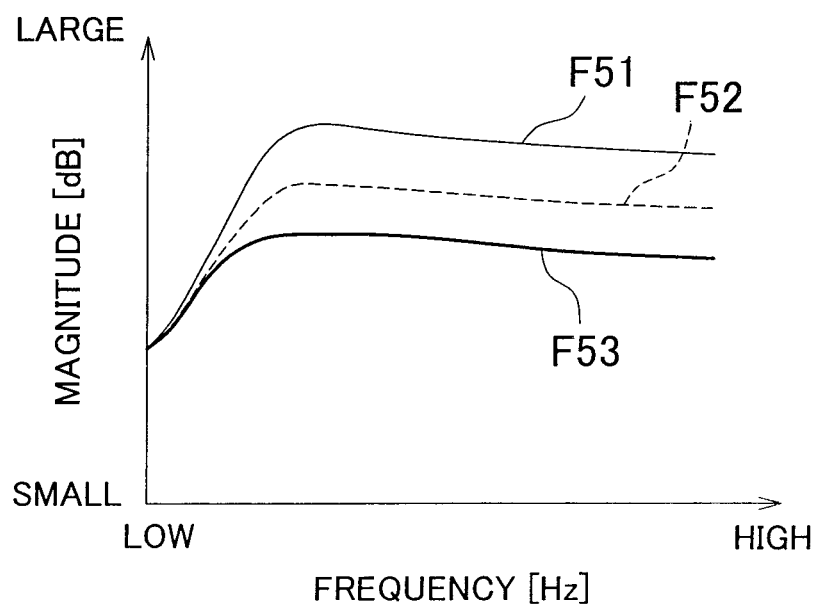
FIG. 17 is a view showing an example of a filter characteristic setting map for a steering system according to the sixth embodiment.
FIG. 18 is a line diagram showing an example of filter characteristics of the steering system according to the sixth embodiment.

FIG. 16 is a block diagram showing an outline of the constitution of an EPS control apparatus according to a sixth embodiment. FIG. 17 is a view showing an example of a filter characteristic setting map for a steering system according to the sixth embodiment. FIG. 18 is a line diagram showing an example of filter characteristics of the steering system according to the sixth embodiment. The steering system and steering control apparatus according to the sixth embodiment differ from those of the fifth embodiment in that vibration is adjusted in accordance with an absolute value of a lateral direction acceleration acting on the vehicle.

A steering system 601 according to this embodiment, shown in FIG. 16, includes an EPS control apparatus 608 serving as the steering control apparatus. The EPS control apparatus 608 adjusts the rotary direction vibration of the steering wheel 2 in accordance with the absolute value of the acceleration acting on the vehicle. Here, the EPS control apparatus 608 varies the magnitude of the rotary direction vibration of the steering wheel 2 by modifying the filter characteristic applied by the filter calculation unit 16 on the basis of a detection signal from a lateral acceleration sensor 623 that detects a lateral direction (a vehicle width direction intersecting the travel direction) acceleration Gy acting on the vehicle, which is a parameter representing an operating condition of the vehicle, or in other words a behavior of the vehicle. Hence, the EPS control apparatus 608 according to this embodiment varies the magnitude of the rotary direction vibration of the steering wheel 2 in accordance with the lateral direction acceleration Gy of the vehicle, detected by the lateral acceleration sensor 623. A signal indicating the lateral direction acceleration Gy of the vehicle detected by the lateral acceleration sensor 623 is input to the filter characteristic determination unit 18. Then, the filter characteristic determination unit 18 determines the filter characteristic to be used in the filter calculation performed by the filter calculation unit 16 on the basis of this parameter.

For example, the filter characteristic determination unit 18 switches the filter characteristic used in the filter calculation of the filter calculation unit 16 on the basis of the lateral direction acceleration Gy of the vehicle detected by the lateral acceleration sensor 623 by referring to a map shown in FIG. 17. Here, as shown in FIGS. 17 and 18, the filter characteristic determination unit 18 is capable of switching the filter characteristic applied by the filter calculation unit 16 in three stages in accordance with the operating conditions. In FIG. 18, a solid line F51 represents a first filter characteristic, a dotted line F52 represents a second filter characteristic, and a solid line F53 represents a third filter characteristic.

Of the filter characteristics applied by the filter calculation unit 16, the third filter characteristic represented by the solid line F53 is a characteristic with which vibration is most likely to be transmitted and the first filter characteristic represented by the solid line F51 is a characteristic with which vibration is least likely to be transmitted. Hence, when the third filter characteristic represented by the solid line F53 is selected as the filter characteristic to be applied by the filter calculation unit 16 in the steering system 601, the rotary direction vibration of the steering wheel 2 is maximized, whereby a maximum amount of vibration is transmitted to the driver from the steering wheel 2.

As shown in FIG. 17, when the lateral direction acceleration of the vehicle is high such that the absolute value of the lateral direction acceleration Gy of the vehicle detected by the lateral acceleration sensor 623 is equal to or larger than a preset high acceleration predetermined value, the filter characteristic determination unit 18 selects the filter characteristic with which vibration is relatively likely to be transmitted. When the lateral direction acceleration of the vehicle is low such that the absolute value of the lateral direction acceleration Gy of the vehicle detected by the lateral acceleration sensor 623 is equal to or smaller than a preset low acceleration predetermined value, the filter characteristic determination unit 18 selects the filter characteristic with which vibration is relatively unlikely to be transmitted. Further, when the lateral direction acceleration of the vehicle is medium such that the absolute value of the lateral direction acceleration Gy of the vehicle detected by the lateral acceleration sensor 623 is smaller than the preset high acceleration predetermined value and larger than the preset low acceleration predetermined value, the filter characteristic determination unit 18 selects the filter characteristic having an intermediate characteristic.

As a result, when the lateral direction acceleration of the vehicle is high, or in other words when the absolute value of the lateral direction acceleration of the vehicle is relatively large, the steering system 601 can relatively increase the amount of vibration transmitted to the driver from the steering wheel 2, and therefore a relatively large amount of information can be transmitted to the driver from the road surface or the like in the form of vibration. When the lateral direction acceleration of the vehicle is low, or in other words when the absolute value of the lateral direction acceleration of the vehicle is relatively small, on the other hand, the steering system 601 can relatively reduce the amount of vibration transmitted to the driver from the steering wheel 2, and therefore the driver can be prevented from feeling discomfort due to disturbance vibration from the road surface or the like, for example.

Hence, the steering system 601 and the EPS control apparatus 608 can control the EPS apparatus 6 to increase the rotary direction vibration of the steering wheel 2 when the absolute value of the acceleration acting on the vehicle is relatively large relative to the rotary direction vibration of the steering wheel 2 when the absolute value of the acceleration is relatively small, and as a result, the driving feeling imparted to the driver can be varied appropriately in accordance with the acceleration acting on the vehicle.

Note that the steering system and steering control apparatus according to the embodiments of the invention described above are not limited to these embodiments and may be subjected to various modifications within the scope set forth in the claims. The steering system and steering control apparatus according to this embodiment may be combined in plural with the embodiments described above.

The steering control apparatus described above may be capable of executing control to adjust rotary direction vibration of a steering member by controlling an adjustment apparatus in accordance with a selection operation performed by the driver (user) via a selection apparatus such as a switch. For example, the filter characteristic determination unit 18 described above may determine the filter characteristic to be used in the filter calculation performed by the filter calculation unit 16 on the basis of a selection operation performed by the driver. For example, the selection apparatus may be configured to be operated by the driver to select a given mode among a plurality of modes in which manners of adjusting the rotary direction vibration of the steering member are different from each other. The manner of adjusting the rotary direction vibration of the steering member may vary in accordance with the operating condition of the vehicle. In this case, the steering control apparatus may control the adjustment apparatus in accordance with the selected mode. According to this configuration, the steering system and steering control apparatus can vary the driving feeling freely in accordance with the wishes of the driver by controlling the adjustment apparatus in accordance with the selection operation performed by the driver in order to adjust the rotary direction vibration of the steering member.

The steering system and steering control apparatus described above may adjust the rotary direction vibration of the steering member on the basis of operating conditions of a so-called Antilock Brake System (ABS), a Brake Assist (BA) apparatus, an Electronic Stability Control (ESC) apparatus (for example, a Vehicle Stability Control (VSC) apparatus), a Traction Control System (TCS), an active steering total control apparatus (for example, a Vehicle Dynamic Integrated Management (VDIM) system), a variable stabilizer apparatus, and so on, which serve as examples of the operating conditions of the vehicle.

In the above description, the adjustment apparatus is an EPS apparatus, and the rotary direction vibration of the steering member is adjusted by adjusting the degree by which vibration is transmitted to the steering member. However, the invention is not limited thereto, and the adjustment apparatus may be provided separately from the EPS apparatus as an independent apparatus.

In the above description, the steering control apparatus adjusts the rotary direction vibration of the steering member by modifying the filter characteristic in accordance with the operating conditions of the vehicle in order to adjust the degree by which vibration is transmitted to the steering member. However, the invention is not limited thereto, and the vibration transmitted to the steering member may be adjusted by directly adjusting the output of the motor 10, for example. In other words, the steering control apparatus may perform control such that the rotary direction vibration of the steering member is increased beyond the disturbance vibration input from the road surface or the like, for example.

In the above description, the steering system is a column assist type column EPS system, but the steering system is not limited thereto and may also be applied to a pinion assist type system or a rack assist type system, for example. Further, the steering system is not limited to an EPS system and may also be applied to a hydraulic power steering system.

The steering system and steering control apparatus described above may be applied to a so-called steer by wire type steering system. In this case, the steering system is constituted such that the steering member (the steering wheel 2, for example) and the steered wheels are mechanically separated. When the driver operates the steering member in a steer by wire type steering system, a steering amount of the steering member is detected by a sensor or the like, whereupon the steering control apparatus drives a steering actuator on the basis of the detected steering amount to turn the steered wheels by applying a predetermined turning force to the steered wheels. Even when applied to a steer by wire steering system, the steering system and steering control apparatus can vary the driving feeling imparted to the driver appropriately in accordance with the operating conditions of the vehicle by controlling the adjustment apparatus to adjust the rotary direction vibration of the steering member. In this case, the steering system and steering control apparatus may use driving information relating to the steering actuator, the axial force of the tie rods, and so on, for example, as the parameter corresponding to the input from the steered wheel side to the steering system side instead of the torque detected by the torque sensor 12 to perform the assist calculation and the filter calculation and modify the filter characteristic.

The steering system and steering control apparatus described above may be applied to a steering system and a steering control apparatus installed in various vehicles.

The invention claimed is:

1. A steering system comprising:
a steering member provided in a vehicle and configured to be rotated;
an adjustment apparatus configured to adjust a rotary direction vibration of the steering member; and
a steering control apparatus configured to control the adjustment apparatus, in accordance with at least one operating condition of the vehicle, so as to adjust the rotary direction vibration, wherein
the adjustment apparatus is configured to adjust a degree by which the rotary direction vibration is transmitted to the steering member,
the adjustment apparatus is configured to adjust the rotary direction vibration by outputting an assist steering force for supplementing a steering force input into the steering member by the driver,
the steering control apparatus is configured to switch between a plurality of filter characteristics of a filter used to calculate the assist steering force, in accordance with the operating condition of the vehicle, the plurality of the filter characteristics having different degrees with which a signal corresponding to the rotary direction vibration is likely to be passed through the filter such that a magnitude of the signal passed through the filter at any given frequency is different for each of the plurality of filter characteristics,
the at least one operating condition includes at least one of a speed of the vehicle or an absolute value of an acceleration acting on the vehicle,
the steering control apparatus controls the adjustment apparatus to increase the rotary direction vibration when the speed of the vehicle is relatively high, relative to the rotary direction vibration when the speed is relatively low, and
the steering control apparatus controls the adjustment apparatus to increase the rotary direction vibration when the absolute value of an acceleration acting on the vehicle is relatively large, relative to the rotary direction vibration when the absolute value of the acceleration is relatively small.

2. The steering system according to claim 1, wherein
the at least one operating condition further includes a torque acting on the steering member, and
the steering control apparatus controls the adjustment apparatus to increase the rotary direction vibration when the torque acting on the steering member is relatively large, relative to the rotary direction vibration when the torque is relatively small.

3. The steering system according to claim 1, wherein
the at least one operating condition further includes a steering angle of the steering member, and
the steering control apparatus controls the adjustment apparatus to increase the rotary direction vibration when the steering angle of the steering member is relatively large, relative to the rotary direction vibration when the steering angle is relatively small.

4. The steering system according to claim 1, wherein
the at least one operating condition further includes a steering angle velocity of the steering member, and
the steering control apparatus controls the adjustment apparatus to increase the rotary direction vibration when the steering angle velocity of the steering member is relatively large, relative to the rotary direction vibration when the steering angle velocity is relatively small.

5. The steering system according to claim 1, wherein the steering control apparatus controls the adjustment apparatus to vary a magnitude of the rotary direction vibration in accordance with a driving tendency in driving the vehicle.

6. The steering system according to claim 5, wherein the steering control apparatus determines the driving tendency on the basis of an operating mode selected in another apparatus having a plurality of operating modes.

7. The steering system according to claim 1, wherein the at least one operating condition of the vehicle further includes at least one of a torque acting on the steering member, a steering angle of the steering member, a steering angle velocity of the steering member, and a driving tendency in driving the vehicle.

8. The steering system according to claim 1, wherein the steering control apparatus is configured to control the adjustment apparatus in accordance with a selection operation performed by a user.

9. The steering system according to claim 1, wherein:
the steering control apparatus is configured to obtain a steering angle velocity, to compare the steering angle velocity obtained with a preset predetermined value to determine whether or not the steering angle velocity is larger than the predetermined value, and
when the steering control apparatus determines that the steering angle velocity is larger than the predetermined value, the steering control apparatus controls the adjustment apparatus to increase the rotary direction vibration, relative to the rotary direction vibration when the steering angle velocity is equal to or smaller than the predetermined value.

10. The steering system according to claim 1, wherein the steering control apparatus controls the adjustment apparatus to increase the rotary direction vibration when the speed of the vehicle is greater than a predetermined value.

11. A steering system comprising:
a steering member provided in a vehicle and configured to be rotated;
an adjustment apparatus configured to adjust a rotary direction vibration of the steering member, the adjustment apparatus being configured to adjust a degree by which the rotary direction vibration is transmitted to the steering member; and
a control apparatus configured to control the adjustment apparatus, in accordance with a selection operation performed by a user, so as to adjust the rotary direction vibration, wherein
the adjustment apparatus is configured to adjust the rotary direction vibration by outputting an assist steering force for supplementing a steering force input into the steering member by the driver,
the control apparatus is configured to switch between a plurality of filter characteristics of a filter used to calculate the assist steering force, in accordance with at least one operating condition of the vehicle, the plurality of the filter characteristics having different degrees with which a signal corresponding to the rotary direction vibration is likely to be passed through the filter such that a magnitude of the signal passed through the filter at any given frequency is different for each of the plurality of filter characteristics,
the at least one operating condition includes at least one of a speed of the vehicle or an absolute value of an acceleration acting on the vehicle,
the steering control apparatus controls the adjustment apparatus to increase the rotary direction vibration when the speed of the vehicle is relatively high, relative to the rotary direction vibration when the speed is relatively low, and the steering control apparatus controls the adjustment apparatus to increase the rotary direction vibration when the absolute value of an acceleration acting on the vehicle is relatively large, relative to the rotary direction vibration when the absolute value of the acceleration is relatively small.

12. A steering control apparatus comprising:

a control unit configured to control an adjustment apparatus, in accordance with at least one operating condition of a vehicle, so as to adjust a rotary direction vibration of a steering member, the adjustment apparatus being configured to adjust a degree by which the rotary direction vibration is transmitted to the steering member, wherein the adjustment apparatus is configured to adjust the rotary direction vibration by outputting an assist steering force for supplementing a steering force input into the steering member by the driver, the control unit is configured to switch between a plurality of filter characteristics of a filter used to calculate the assist steering force, in accordance with the at least one operating condition of the vehicle, the plurality of the filter characteristics having different degrees with which a signal corresponding to the rotary direction vibration is likely to be passed through the filter such that a magnitude of the signal passed through the filter at any given frequency is different for each of the plurality of filter characteristics, the at least one operating condition includes at least one of a speed of the vehicle or an absolute value of an acceleration acting on the vehicle, the steering control apparatus controls the adjustment apparatus to increase the rotary direction vibration when the speed of the vehicle is relatively high, relative to the rotary direction vibration when the speed is relatively low, and the steering control apparatus controls the adjustment apparatus to increase the rotary direction vibration when the absolute value of an acceleration acting on the vehicle is relatively large, relative to the rotary direction vibration when the absolute value of the acceleration is relatively small.

* * * * *